US005732367A

United States Patent [19]
Yost et al.

[11] Patent Number: 5,732,367
[45] Date of Patent: Mar. 24, 1998

[54] REDUCTION OF LEACHABILITY AND SOLUBILITY OF RADIONUCLIDES AND RADIOACTIVE SUBSTANCES IN CONTAMINATED SOILS AND MATERIALS

[75] Inventors: Karl W. Yost, Crete, Ill.; Steven A. Chisick, Durham, N.C.

[73] Assignee: Sevenson Environmental Services, Inc., Niagara Falls, N.Y.

[21] Appl. No.: 663,692

[22] Filed: Jun. 14, 1996

Related U.S. Application Data

[63] Continuation-in-part of Ser. No. 31,461, Mar. 15, 1993, Pat. No. 5,527,982, which is a continuation-in-part of Ser. No. 721,935, Jul. 23, 1991, Pat. No. 5,193,936, which is a continuation-in-part of Ser. No. 494,774, Mar. 16, 1990, abandoned.

[51] Int. Cl.$^6$ .................................................. G21F 9/00
[52] U.S. Cl. .............................. 588/16; 588/2; 405/128
[58] Field of Search ........................ 588/2, 16; 405/128

[56] References Cited

U.S. PATENT DOCUMENTS

| | | |
|---|---|---|
| 1,069,959 | 8/1913 | Koss . |
| 1,100,743 | 6/1914 | Keetman et al. . |
| 1,351,489 | 8/1920 | Ryan . |
| 1,371,741 | 3/1921 | Dietsche . |
| 2,157,511 | 5/1939 | Urbain et al. . |
| 2,208,173 | 7/1940 | Urbain et al. . |
| 2,425,573 | 8/1947 | Soddy . |
| 2,859,093 | 11/1958 | Russell et al. . |
| 2,981,593 | 4/1961 | Pagny . |
| 3,101,998 | 8/1963 | Milliken et al. . |
| 3,201,268 | 8/1965 | Hemwall . |
| 3,647,361 | 3/1972 | Coltrinari et al. ............... 423/21.1 |
| 3,764,553 | 10/1973 | Kirby ............................... 588/2 |
| 3,914,381 | 10/1975 | Sugahara et al. ................. 423/305 |
| 3,988,258 | 10/1976 | Curtiss et al. ..................... 588/3 |
| 4,001,013 | 1/1977 | Wormsbecher et al. . |
| 4,103,963 | 8/1978 | Espenscheid et al. ............. 299/4 |
| 4,116,705 | 9/1978 | Chappell ........................... 106/90 |
| 4,265,862 | 5/1981 | White et al. ....................... 423/21.1 |
| 4,274,976 | 6/1981 | Ringwood . |
| 4,311,676 | 1/1982 | Demarthe et al. ................. 423/10 |
| 4,443,133 | 4/1984 | Barrett ............................. 405/263 |
| 4,486,397 | 12/1984 | Eshraghi et al. .................. 423/306 |
| 4,528,129 | 7/1985 | Manchak .......................... 252/628 |
| 4,530,765 | 7/1985 | Sabherwal ........................ 210/663 |
| 4,536,034 | 8/1985 | Otto, Jr. et al. .................... 299/5 |
| 4,652,381 | 3/1987 | Inglis ............................... 210/724 |
| 4,671,882 | 6/1987 | Douglas et al. ................... 210/720 |
| 4,701,219 | 10/1987 | Bonee ............................. 106/118 |
| 4,762,690 | 8/1988 | Brunner et al. ................... 423/3 |
| 4,847,008 | 7/1989 | Boatner et al. ................... 252/629 |
| 4,889,640 | 12/1989 | Stanforth ......................... 210/751 |
| 4,891,164 | 1/1990 | Gaffney et al. ................... 257/629 |
| 4,935,146 | 6/1990 | O'Neill et al. ................... 210/684 |
| 5,009,793 | 4/1991 | Muller ............................. 210/710 |
| 5,037,479 | 8/1991 | Stanforth ......................... 106/691 |
| 5,162,600 | 11/1992 | Cody et al. ....................... 588/236 |
| 5,193,936 | 3/1993 | Pal et al. .......................... 405/128 |
| 5,202,033 | 4/1993 | Stanforth et al. ................. 210/747 |
| 5,304,709 | 4/1994 | Babcock et al. .................. 588/257 |
| 5,366,634 | 11/1994 | Vijayan et al. ................... 210/628 |
| 5,403,565 | 4/1995 | Delloye et al. ................... 423/2 |
| 5,409,678 | 4/1995 | Smith et al. ...................... 423/9 |
| 5,434,331 | 7/1995 | Barkatt et al. .................... 588/1 |
| 5,527,982 | 6/1996 | Pal et al. .......................... 588/256 |
| 5,645,518 | 7/1997 | Wagh et al. ...................... 588/252 |

FOREIGN PATENT DOCUMENTS 2122595  1/1984  United Kingdom .

*Primary Examiner*—Ngoclan Mai
*Attorney, Agent, or Firm*—Kevin E. McDermott

[57] ABSTRACT

A process for chemical fixation of radionuclides and radioactive compounds present in soils and solid materials. Radionuclides and other radioactive compounds are converted to low-temperature Apatite-Group structural isomorphs (general composition: $(AB)_5 (XO_4)_3 Z$), usually phosphatic, that are insoluble, non-leachable, non-zeolitic, and pH stable by contacting with a sulfate, hydroxide, chloride, fluoride and/or silicate source and with a phosphate anion in either a one or two step process. In the preferred embodiment, soils or contaminated materials containing radionuclides and radioactive wastes are contacted with technical grade phosphoric acid (TGPA) which contains sulfates as an impurity. The Apatitic-structure end product is chemically altered from the initial material and reduced in volume and mass. The end product can be void of free liquids and exhibits sufficiently high levels of thermal stability to be effective in the presence of heat generating nuclear reactions. The process occurs at ambient temperature and pressure.

16 Claims, 3 Drawing Sheets

REDUCTION OF LEACHABILITY AND SOLUBILITY OF RADIONUCLIDES AND RADIOACTIVE SUBSTANCES IN CONTAMINATED SOILS AND MATERIALS

CROSS REFERENCE TO RELATED APPLICATIONS

This application is a continuation-in-part of U.S. patent application Ser. No. 08/031,461, filed on Mar. 15, 1993, now U.S. Pat. No. 5,527,982, which is a continuation-in-part of U.S. patent application Ser. No. 07/721,935, filed Jul. 23, 1991, now U.S. Pat. No. 5,193,936, Reexamination Certificate issued Mar. 19, 1996, which is a continuation-in-part of U.S. patent application Ser. No. 07/494,774, filed Mar. 16, 1990, abandoned.

FIELD OF THE INVENTION

The present application describes treatment methods for metal-bearing materials, especially lead-bearing materials, such as process streams, sludges and slurries, including all types of liquid and solid wastes.

Another embodiment of the present invention pertains to the field of chemical fixation of radionuclides and radioactive substances in debris, soils, solid materials, sludges and materials precipitated or filtered from liquids, rendering said radionuclides and radioactive substances within a stabilized, insoluble; non-leachable, non-zeolitic and pH stable form suitable for safe and ecologically-acceptable disposal; typically regulated by the U.S. Department of Energy, the U.S. Environmental Protection Agency ("USEPA"), and others. The ecologically safe state of the treated materials is not altered by exposure of the treated materials to acidic leachate, acid rain, or radioactive groundwater. In addition, the safe state of the treated materials is not altered by exposure to changing weather conditions; including rain, heat, freeze and thaw.

BACKGROUND OF THE INVENTION

Only a few prior art patents have taught the immobilization of lead in different kinds of wastes to make the treated residuals suitable for disposal as special waste in a RCRA approved and licensed landfill facility. For example, some known methods to treat broader groups of metals are shown in U.S. Pat. No. 4,149,968 to Kupiec et al., U.S. Pat. Nos. 4,889,640 and 4,950,409 to Stanforth, U.S. Pat. No. 4,701,219 to Bonee, U.S. Pat. No. 4,652,381 to Inglis, and U.S. Pat. No. 4,671,882 to Douglas et al.

Kupiec et al. teaches the immobilization of heavy metals by treating an alkaline slurry of waste with a mixture of bentonite clay and Portland Cement.

Stanforth teaches a method of treating solid hazardous waste (containing unacceptable levels of lead and cadmium) with reactive calcium carbonate, reactive magnesium carbonate and reactive calcium magnesium carbonate. The patent teaches that addition of water is beneficial to facilitate the mixing of the solid waste with treatment additive and conversion of lead into non-leachable forms. Stanforth further discloses mixing solid waste with lime land carbon dioxide or bicarbonate.

Bonee discloses that calcium chloride, calcium carbonate, gypsum and sodium carbonate are relatively ineffective at reducing the leaching of vanadium and nickel from a petroleum cracking process particulate waste.

Douglas et al. discloses a process for producing a non-hazardous sludge from an aqueous solution by addition of phosphoric acid or an acid phosphate salt, adjusting the Ph to about 5, adding a coagulating polymer and raising the Ph to above 7 through the addition of lime. Then, the process includes dewatering the resulting sludge. This constitutes at least 5 or more steps making it cumbersome, time consuming and expensive.

Inglis teaches a process of treating industrial wastewater which has a pH of 2 and which is contaminated with sulfuric acid, lead, copper and zinc. Calcium carbonate is added along with air to wastewater. This results in neutralization and formation of insoluble metal salts. The process is not applicable to wastes that have a pH of 6 to 9. However, limestone is relatively ineffective in removing lead from hazardous, solid or sludge material. Limestone does not react in the solid materials and metal carbonates that are formed are subject to degradation by acid rain and acidic landfill leachate conditions.

Hazardous wastes containing excessive amounts of leachable lead are banned from land disposal. The regulatory threshold limit under Resource Cons. and Recovery Act is 5 mg/l of leachable lead as measured by TCLP (toxicity characteristic leaching procedure) test criteria, United States Environmental Protection Agency (USEPA) method 1311 (SW-846). Waste materials containing TCLP lead levels in excess of 5 mg/l are defined as lead-toxic hazardous waste and are as such restricted from landfilling under current land ban regulations. The cost of disposing lead toxic hazardous waste materials in excess of $200.00 per ton plus the cost of transporting the hazardous material to landfills for hazardous wastes, which do not exist in every state. This makes the disposal of lead toxic hazardous waste materials very expensive. Therefore, treating the lead-bearing process materials and waste streams to render them non-hazardous by RCRA definition would cut down the costs of transportation and disposal tremendously.

Conventional treatment methods for radionuclides and other radioactive substances can be categorized into three groups: 1) separation; 2) structural containment; and 3) physical stabilization/solidification. These treatment methods are complex, costly, expand volumes, and are only temporary solutions.

Various conventional methods have been tried to remove leachable, mobile radionuclides and radioactive substances from soils and other materials. Removal of contamination from soils and solid materials by leaching, centrifugation, extraction and/or washing procedures is extremely expensive and cost-prohibitive because these methods generate vast quantities of contaminated liquid wastes which require further treatment and disposal.

Conventional solidification methods based on cementation technology require up to twenty-eight (28) days curing time, increase the waste volume and may raise the pH above 12.5, USEPA defines a pH above 12.5 as hazardous. Hardened cementitious material is not conducive to retreatment in the event treatment fails obligatory confirmation testing. Solidification methods utilizing lime kiln dust, calcium carbonate and/or powdered lime for fixation are, at best, temporary solutions. Furthermore, these methods increase the waste volume and mass. A primary concern is that cementitious methods dilute the parameters of concern in the final waste matrix.

In the past, radionuclide and radioactive wastes have been temporarily stored; frequently as a liquid, a sludge, or a contaminated fine-grained solid in conjunction with contaminated soils. The art has recognized that a means must be provided for permanent disposal of these wastes, preferably as non-leachable solids, containing non-migratory radionuclides. Such solids must have certain characteristics which make the solids safe and economical for the long term ($10^3$ to $10^6$ years) retention of radioactive isotopes.

SUMMARY OF THE INVENTION

The present invention discloses a method of treating metal-bearing, especially lead-bearing process materials and lead-toxic hazardous wastes.

The present invention relates to a chemical treatment technology for immobilizing leachable lead in contaminated soils and solid waste materials. According to the present invention, a process for treating lead-toxic solid wastes in order to stabilize the leachable lead is disclosed, comprising the steps of: (i) mixing the solid waste with a sulfate compound, such as calcium sulfate dihydrate (gypsum powder) or sulfuric acid, having at least one sulfate ion for contacting waste particles and reacting with said leachable lead to produce a substantially insoluble lead composition, such as anglesite and/or calcium-substituted anglesite; and, (ii) mixing said solid waste and sulfate compound with a phosphate reagent, such as phosphoric acid, having at least one phosphate ion for reacting with said leachable lead to produce a substantially insoluble lead composition. The treated material from this process is substantially solid in form and passes the Paint Filter Test while satisfying the regulatory standard for TCLP lead. In all instances, application of this process has been found very reliable in meeting the treatment objectives and in consistently decreasing waste volume.

It is an object of the present invention to provide a technology for treatment of lead-containing solid waste and soil that produces an acceptably low level of leachable lead in the final product to comply with the statutory requirements of TCLP and to pass the Paint Filter Test.

Another object of the invention is to provide such a process while producing no wastewater or secondary waste streams during said process.

Still another object of the invention is to provide such a process which also causes the solid waste material to undergo a volume reduction as a result of treatment.

Yet another object of the invention is to cause fixation of the leachable lead in the solid waste that is permanent under both ordinary and extreme environmental conditions.

The invention relates to treatment methods employed to chemically convert leachable metal in metal-bearing solid and liquid waste materials to a non-leachable form by mixing the material with one or a combination of components, for example, lime or gypsum and phosphoric acid. The solid and liquid waste materials include contaminated sludges, slurries, soils, wastewaters, spent carbon, sand, wire chips, plastic fluff, cracked battery casings, bird and buck shots and tetraethyl lead contaminated organic peat and muck. The metal-bearing materials referred to herein which the present invention treats include those materials having leachable lead, aluminum, arsenic (III), barium, bismuth, cadmium, chromium (III), copper, iron, nickel, selenium, silver and zinc. The present invention discloses a process comprising a single step mixing of one or more treatment additives, and a process comprising a two step mixing wherein the sequence of performing the steps may be reversible. The present invention provides a novel way of treating a plurality of metal-contaminated materials at a wide range of pH. The method works under acidic, alkaline and neutral conditions.

The processes of the present invention provide reactions that convert leachable metals, especially lead, into a non-leachable form which is geochemically stable for indefinite periods and is expected to withstand acid rain impacts as well as the conditions of a landfill environment.

A first group of treatment chemical for use in the processes of the present invention includes lime, gypsum, alum, halites, portland cement, and other similar products that can supply sulfates, halides, hydroxides and/or silicates.

A second group consists of treatment chemicals which can supply phosphate ions. This group includes products such as phosphoric acid, pyrophosphates, triple super phosphate (TSP), trisodium phosphate, potassium phosphates, ammonium phosphates and/or others capable of supplying phosphate anion when mixed with a metal-bearing process material or with a metal-toxic hazardous waste. Depending on the process material or waste (i) matrix (solid, liquid or mixture thereof), (ii) category (RCRA or Superfund/CERCLIS), (iii) chemical composition (TCLP lead, total lead level, pH) and (iv) size and form (wire fluff, shots, sand, peat, sludge, slurry, clay, gravel, soil, broken battery casings, carbon with lead dross, etc.) the metal-bearing material is mixed with one or more treatment chemicals in sufficient quantity so as to render the metal substantially non-leachable, that is, to levels below the regulatory threshold limit under the TCLP test criteria of the USEPA. For lead-bearing material, the treatment additives render the lead below the regulatory threshold limit of 5 mg/l by the TCLP test criteria of the USEPA. The disposal of lead-hazardous and other metal-hazardous waste materials in landfills is precluded under land ban regulations.

It is an object of the present invention to provide a method of treating metal-bearing materials, contaminated soils and waste effluent, and solid wastes containing hazardous levels of leachable metal. It is a further object to provide a method which decreases the leaching of lead in lead-bearing materials to levels below the regulatory limit of 5 mg/l by TCLP test criteria.

It is another object of the present invention to provide a method to immobilize lead to leachable levels below 5 mg/l by TCLP test criteria, through the use of inexpensive, readily accessible treatment chemicals. With this method the leachability of lead is diminished, usually allowing municipal landfill disposal which would not otherwise be permitted.

Yet another object of the present invention is to provide a treatment method for metal-bearing wastes, particularly lead-bearing wastes, which comprises a single step mixing process or a two-step process wherein the sequence of the two steps may be reversed.

Another object of the present invention is to provide a method of treating a wide variety of lead bearing process materials, wire fluff and chips, cracked battery plastics, carbon with lead dross, foundry sand, lead base paint, leaded gasoline contaminated soils, peat and muck, sludges and slurries, lagoon sediment, and bird and buck shots, in order to render the material non-hazardous by RCRA definition, and pass the EPTOX, MEP, ANS Calvet and DI Water Extract tests.

Another object of the present invention is to extend the scope for broad application in-situ as well as ex-situ on small as well as large quantities of metal-bearing process materials or generated waste streams.

The present invention provides a method which converts metal-toxic process materials and hazardous wastes into a material which has a lower leachability of metal as determined by EPA's TCLP test. Such treated waste material can then be interned in a licensed landfill, a method of disposal only possible when the leachability of metal is diminished/ reduced to levels below the regulatory threshold limit by TCLP test criteria, e.g., lead below 5 mg/l.

Another embodiment of the present invention relates to a chemical treatment process that reduces the leachability and solubility of radionuclides and other radioactive substances contained in debris, soils, sludges and solid materials ("the host material" or "the host matrix"). The process comprises contacting radionuclides and other radioactive substances in the host matrix with the first and second group treatment chemicals to promote recrystalli-zation of the host material into Apatitic-structured end-products. Preferred reactants are comprised of at least one phosphate group and create mineral species of Apatitic geometric structures with reduced nuclide leachability and solubility. In the preferred embodiment, technical grade phosphoric acid (TGPA) is used in a one step process. TGPA contains sulfate as an impurity in addition to a phosphate anion source.

The Apatite-structure $((AB)_5(PO_4)_3 Z)$ is preferred since the anion Z position is usually a halogen or a hydroxyl, both active scavengers of cations. The unique properties of the Apatitic-structure, $(AB)_5(XO_4)_3 Z$, are key to this invention. Just as low-temperature Apatite is nature's ion-prison in the biological/biosphere environment and high-temperature Apatite is natures ion-prison in the pegmatites/igneous lithosphere environment, Apatites can do the same in man-made (unnatural/synthetic) radioactive environments. The supplementary problem of metamict lattice disruptions, from the generation of excess heat and ion-cannon recoil damage by radioactive decay, is also self-resolved in Apatites.

Both low-temperature and high-temperature Apatitic-structures are self-healing and non-leaching. In one embodiment of the present invention, the flow of normal groundwater through the treated material should be encouraged since the groundwater will disperse the build-up of heat and eliminate the requirement for costly cooling of monolithic encasement structures. In another embodiment of the present invention, treated material contacted with groundwater contaminated with radionuclides and radioactive substances reduces the radioactive level of the ground water.

Natural scavenging of Lanthanides and Actinides by Apatitic-structure phosphate-complexing phases is well-documented from research conducted in connection with the mining of oceanic deposits throughout the world to produce phosphate products. To date, more than 300 Apatite mineral species have been classified by geologists.

Substitution within Apatites are extremely complex. Many require a charge-compensating mechanism that can be grossly estimated from ionic radii and coordination numbers. Common substitution mechanisms noted are as follows: 1) simple within-site substitutions; 2) coupled substitutions involving chemically similar cations; 3) substitutions involving large cations, such as Cs, with smaller cations; 4) substitutions involving cation vacancies; 5) substitutions coupling specific cations with specific anions; 6) substitutions involving anions; 7) substitutions involving anion vacancies; and 8) substitutions involving a change in valence.

From the structural and compositional studies of natural and synthetic Apatites, it is known that Apatites are complex geological structures. The present invention has found that Apatites can sustain a great variety of substitutions following the general formula $(AB)_5 (XO_4)_3 Z$, [sometimes written, $(AB)_{10} (XO_4)_6 Z_2$], wherein:

A = Coordination Number 7 thru 12, most commonly 9. Cations smaller than $Mn^{+2}$ are to small for an 8 coordination number, unless combined with a larger cation.
  = Ca, Sr, Mn, Pb, Mg, Ba, Zn, Cd, Fe, Ni, Co, Sn, Eu Cu, and Be among divalent elements.
  = Na, K, Rb, Ag, Cs and possibly Li among monovalent elements.
  = Al, Fe, Y, rare earth elements (REE) except Eu and Ce, Bi and possibly Nb, Sb and Ti among trivalent elements.
  = U, Pb, Th, Zr, Ce, Transuranics and possibly Tl among quadrivalent elements.
  = [ ] minor lattice vacancies.
B = Coordination Number 6 thru 9, most commonly 8. Cations smaller than $W^{+6}$ are small for 6 coordination number and those larger than $Zr^{+4}$ are too large.
  = Ca, Sr, Mn, Pb, Mg, Ba, Zn, Cd, Fe, Ni, Co, Sn, Cu, and Be among divalent elements.
  = Na, K, Rb, Ag, Li possibly among monovalent elements.
  = Al, Fe, Sc, Sb, Y, Eu and Ce REE, Nb, Bi and possibly Ta among trivalent elements.
  = Si, Mn, Ti, Mo, W, Sn, U, Th, Zr, C among quadrivalent elements.
  = Actinide ion species conforming to Metal.$O_2$ (especially $UO_2$).
  = [ ] minor lattice vacancies.

$XO_4 = PO_4$, $SiO_4$, $SO_4$, $AsO_4$, $VO_4$, $CrO_4$, $BeO_4$, $MoO_4$, $CO_3$, $CO_3F$, $WO_4$, $MnO_4$, $CO_3OH$, $BO_4$, $AlO_4$, $Fe_3O_4$, possibly $GeO_4$, and $SeO_4$.

Z=F, OH, Cl, Br, I, O and [ ] minor lattice vacancy in structure of defective Apatites.

Element 43—Technetium is effected by the process with leachability greatly reduced; however, its positioning within the Apatitic-structure has not been determined with certainty.

Additionally, the radius ratios among A; B and $XO_4$ components, and their respective coordination number, can have a strong influence on the Apatite-structure. Problems occur when an element's ionic radius is small for A and large for B; therefore, a single site cannot be considered alone and a partitioning between A and B sites is proposed. The partitioning is extremely difficult to predict since the amounts involved may be very minor as well as promoting localized crystal disorder.

In its simplest and most efficient form, the current invention provides for the addition of at least one member selected from a first group of treatment chemicals that can supply sulfates, halides, hydroxides and/or silicates and at least one member selected from a second group of treatment chemicals that can supply phosphate ions to material consisting of, or containing, radionuclides and other radioactive substances. Technical grade phosphoric acid ("TGPA") that contains up to 70% (by weight) phosphate (as $P_2O_5$) and sulfate ($SO_4^{-2}$), typically as sulfuric acid in the range of 2.5% to 7% (by weight) as an impurity, is a source of both a sulfate ion and a phosphate ion and can, therefore, be used as a single reactant. The addition of water at any point in the process aids in the dispersion of the TGPA throughout the host matrix. As the TGPA disperses and permeates through the matrix and during the course of subsequent reactions, the leachability and solubility of radionuclides and other radioactive substances is reduced. Supplemental mechanical or physical mixing can also be employed to enhance the contact of the TGPA with the leachable species in the host material.

As a true chemical process, an object of the invention relies on molecular bonding and crystal nucleation principles to reduce nuclide solubility and to create conditions suitable for matrix volume reduction resulting, in part, from the dehydration properties of the treatment chemicals. When TGPA is utilized, molecular rearrangement and minimized addition of treatment agents is characteristic of the invention and supplemental buffering agents or traditional strength enhancement physical-binding additives typical of physically stabilized mixtures are not required. The end-product of the invention is a material that contains no free liquids and produces no supernatant wastewater or secondary waste streams. A further loss of water weight is achieved by capillary drying and evaporation which also contribute to volume reduction. Some volume reduction can be attributed to acidic carbonate destruction, especially those not incorporated into the Apatitic structures. The end product is friable and can be handled with traditional earth-moving equipment, as it is not monolithic in form.

Moreover, the end-product can be made to have enhanced geotechnical properties without compromising the chemistry of the nuclide leachability/solubility reduction. The addition of water, either to suppress dust or due to rainfall, and excavation or other material handling activities do not affect the nuclide leachability or solubility of the end-product.

Another object of the invention is to increase the level of protection offered by disposal facility designs engineered specifically to control, isolate, or contain material characterized with leachable radionuclides; and to minimize the migration of radionuclides and other radioactive substances from material that is accessed by the percolation of rain and surface waters, and/or the intrusion and flow-through of groundwater or leachate that can act as an ion-carrier. When groundwater contaminated with radionuclides and radioactive substances are contacted with materials treated by the present invention, the radioactive level of the groundwater will be reduced. The radionuclides and radioactive substances in the groundwater react with the phosphate compounds and sulfate compounds in the treated materials to form geochemically stable Apatite-structures.

A further object of the present invention is the addition of liquid or solid reagents to a solid material or sludge without creating secondary byproducts or separable streams. Another object of the present invention is to engage and employ preexisting carbonates, borates, sulfates, and/or silicates within the matrix at the time of phosphate anion addition so that they contribute to the formation of Apatitic-structures that reduce nuclide leachability and solubility and host matrix volume. An additional objective of the invention is the immediate initiation of process reactions upon the contacting of phosphate anion with the leachable or soluble species, without the separation of nuclides or other byproducts from the matrix. Another objective is the in situ or ex situ application of process reagents to nuclide material; wherein fixation of the nuclides is permanent under both ordinary and extreme environmental conditions. Still another object of the invention is the use of acidity to enhance disassociation of semi-soluble species so that problematic nuclides are freed to nucleate within the Apatite crystals. These and other objects will be apparent from the detailed description of the invention set forth below.

The invention may be more fully understood with reference to the accompanying drawings and the following description of the embodiments shown in those drawings. The invention is not limited to the exemplary embodiments but should be recognized as contemplating all modifications within the skill of an ordinary artisan.

DESCRIPTION OF THE PREFERRED EMBODIMENT

Figure 1:
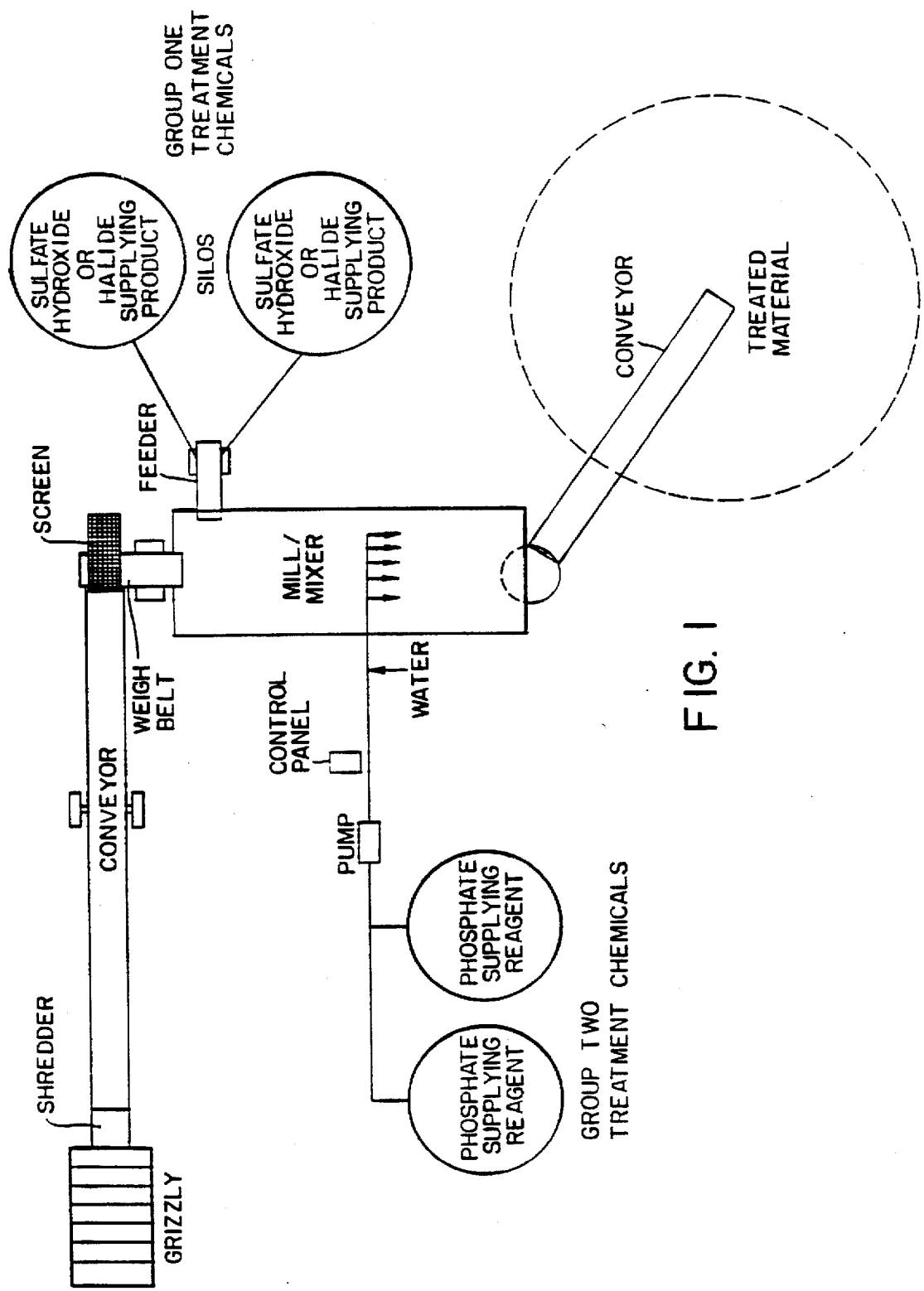
FIG. 1 exhibits the single step mixing method of treatment chemicals metered into the pugmill or Maxon Mixer capable of processing lead hazardous waste materials at rates up to 100 tons/hour.
Figure 2A:
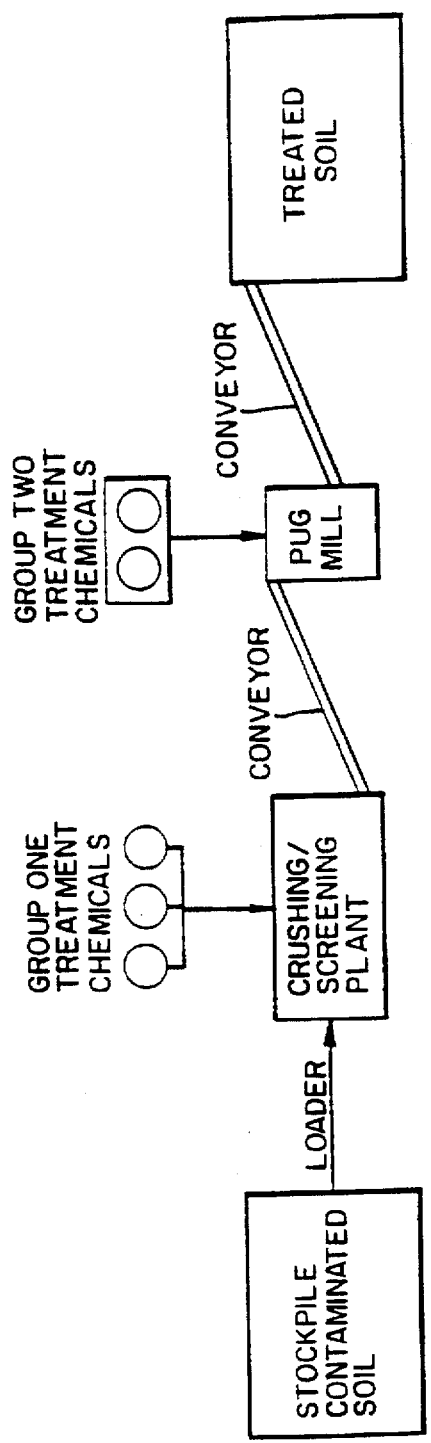
FIG. 2(a) exhibits the two step mixing method with addition of group one treatment chemicals during step I and addition of group two treatment chemicals during step II.
Figure 2B:
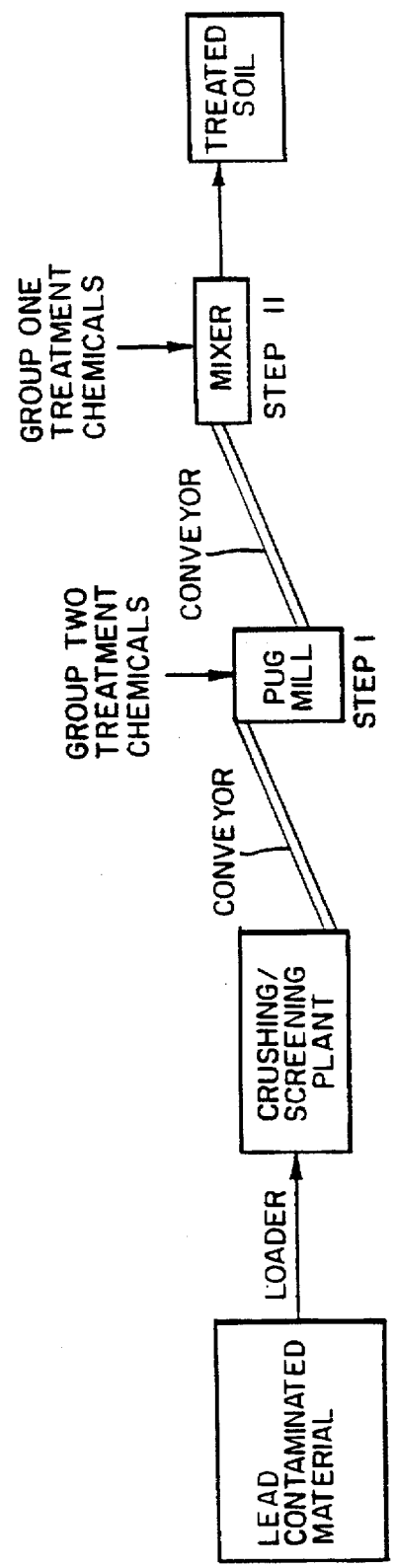
FIG. 2(b) exhibits the two step mixing method with addition of group two treatment chemical(s) during step I and addition of group one treatment chemical(s) during step II. The reversibility of steps and combination of both steps into a single step is the discovery that is disclosed in this invention and illustrated in FIG. 1 and 2(a) and (b).

According to the present invention, leachable lead in treated materials is decreased to levels well below 5.0 mg/l, measured by TCLP test criteria. Waste and process materials having a TCLP lead level in excess of 5 mg/l are considered hazardous and must be treated to be brought into compliance with regulatory requirements. Other metal-bearing materials having leachable may also be treated according to the present invention to achieve acceptable metal levels.

The treatment technology according to another embodiment of the present invention consists of a two step process for treating contaminated soils and/or solid waste materials with chemical treating agents that convert leachable lead to synthetic (man-made) substantially insoluble lead mineral crystals. As used here, "substantially insoluble" means the leachable lead content in the treated waste sample is less than 5.0 mg/l in the extract by the TCLP Test.

Another preferred embodiment of the present invention consists of applying technical grade phosphoric acid (TGPA) that contains sulfate as an impurity to leachable and soluble radionuclides and other radioactive substances often found in debris, soils and solid materials. The addition of water aids in the dispersion and percolation of TGPA throughout the contaminated host matrix. Water can be added at any point of the process, either before or after the TGPA addition, or by diluting the TGPA and applying the dilute TGPA to the target matrix. Mixing of the TGPA with the host matrix is optional, dependent upon the permeability and porosity of the host material. When employed, mixing enhances the uniformity of reagent dispersion through the host material.

Treatment Chemicals and Additives

The treatment chemicals useful in the present invention may be divided into two groups. The addition of water with the additives may facilitate the ultimate mixing and reaction.

A first group, "group one", comprises of a source of sulfate, hydroxide, chloride, fluoride and/or silicates. These sources are gypsum, lime, sodium silicate, cement, calcium fluoride, alum and/or like similar products.

The second group, "group two", comprises a source of phosphate anion. This group consists of products like phosphoric acid (phosphoric), pyrophosphates, triple super phosphate, trisodium phosphates, potassium phosphates, ammonium phosphates and/or similar compounds capable of supplying a phosphate anion.

The first step of this novel process comprises the reaction of leachable lead in contaminated soils or solid waste materials with a gypsum powder, calcium sulfate dihydrate ($CaSO_4 \cdot 2H_2O$). Calcium sulfate dihydrate powder reacts with leachable and mobile lead species in wastes to form hard sulfates, which are relatively insoluble in water. In the invention, the powder form of dry calcium sulfate dihydrate, or gypsum, is preferred for blending with lead contaminated materials because it provides a uniform cover or dry coating over the surfaces of the waste particles and aggregates under low moisture conditions. The greatest benefit and fastest reaction is achieved under conditions wherein 95% of the powder is passable through a 100 mesh sieve, and the remaining 5% is passable through a 20 mesh sieve.

The amount of gypsum powder employed is typically from 0–30 percent of the weight of solid waste material being treated. The actual amount employed will vary with the degree and type of lead contamination in the waste material or soil, and with the initial composition as well as the condition of the waste material, among other factors.

Alternatively, sulfuric acid, or alum in liquid or powder form can also be used as sources of sulfate ion in certain solid wastes that contain sufficient calcium prior to treatment.

Treatment Method

At least one component from group one is added to the mixing vessel or reactor, preferably as a dry powder although slurries could be pumped under certain circumstances. At least one component from group two is added to the mixing vessel or reactor as either liquid reagent or as granular solid materials.

The ingredients of group one and group two can be added to the hazardous waste materials simultaneously, and they are pre-mixed and added in a single step. Alternatively, the components of group one and two can be added sequentially in a two-step process with either component added first. That is, the two steps may occur in any order. At least one ingredient of group one can be added in step I or step II. Likewise, at least one ingredient of group two can be added in either step I or step II. Enough water may be added to allow good mixing to prevent dust formation, and to permit good chemical reaction. Not too much water is added to solid materials if the treated waste is to pass the paint filter test.

In the first step of the instant process, a thorough and uniform mixing of gypsum powder with the solid waste is accomplished by mixing shredded and screened waste particles with small gypsum particles in, for example, a grizzly or other mixing device. The calcium ions from the gypsum powder displace lead from soil complexes and organic micelles present in the contaminated soil and solid waste material. The following equations (1) and (2) describe the reaction of leachable lead with gypsum.

Anglesite

$$Pb\text{-Micelle} + CaSO_4 \cdot 2H_2O \longrightarrow PbSO_4 + Ca\text{-Micelle} + 2H_2O \quad (1)$$

Anglesite

$$Pb(HCO_3)_2 + CaSO_4 \cdot 2H_2O \longrightarrow PbSO_4 + CaCO_3 + 3H_2O + CO_2 \quad (2)$$

The reaction of lead with gypsum forms a "hard sulfate" which crystallizes into mineral species of the barite family—anglesites and calcium-substituted anglesites—which are insoluble in water. The solubility product of lead sulfate is $1.8 \times 10^{-8}$, indicating that anglesite crystals would continue to develop over the geologic periods.

In the second step of the process, the solid waste material as amended with gypsum powder is treated with a phosphate-supplying reagent, such as (for example), phosphoric acid. Upon contact with the soil or solid waste, the phosphate-supplying reagent reacts chemically to immobilize the remaining leachable lead. The phosphate-supplying reagent includes phosphate ion sources having one or more reactive phosphate ions, such as phosphoric acid, trisodium phosphate, a potassium phosphate and monobasic or dibasic calcium phosphates.

The quantity of phosphate-supplying reagent employed will vary with the characteristics of the solid waste being treated, including particularly such factors as leachable lead content, total lead, and buffering capacity, among other factors. It has been determined that in most instances a quantity of phosphoric acid up to 30 percent of the weight of the waste material is sufficient. The concentration of phosphoric acid in solution will typically range from about 2 to 75 percent by weight. The solution and treatment process are maintained above 30° F. to permit the handling of the phosphoric acid as a liquid reagent. Below 30° F., the phosphoric acid tends to gel while water freezes to form ice, thus creating material handling problems.

Free lead, along with calcium ions found in the solid waste (including those imparted through the first step of the process), reacts with the phosphate to form insoluble superhard rock phosphates or calcium substituted hydroxy lead apatites as shown in equation (3a and b):

Hydroxy Lead Apatites

$$4PbCO_3 + CaCO_3 + 3H_3PO_4 \longrightarrow Pb_4Ca(OH)(PO_4)_3 + 5CO_2 + 4H_2O \quad (3a)$$

Hydroxy Lead Apatites

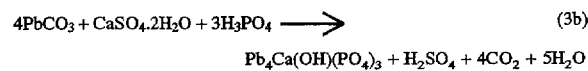

$$4PbCO_3 + CaSO_4 \cdot 2H_2O + 3H_3PO_4 \longrightarrow \quad (3b)$$

$$Pb_4Ca(OH)(PO_4)_3 + H_2SO_4 + 4CO_2 + 5H_2O$$

The phosphate ions are added to the contaminated soils in solution form; for example, phosphoric acid may be added to water in amounts ranging from about 2 percent to about 75 percent by weight. Phosphoric acid decomposes carbonates and bicarbonates in wastes leading to the synthesis of apatites and evolution of carbon dioxide gas. Destruction of carbonates and bicarbonates contributes to desirable volume reductions.

Although water molecules are generated during the carbonate and bicarbonate decomposition process, it is preferred to have soil moisture at about 10 per cent to about 40 per cent by weight of the soil in order to accelerate the fixation of the leachable lead with the phosphate ions. At this moisture range, material handling is also easy and efficient. It is apparent from Equations (2), (3a) and (3b) that gypsum and phosphoric acid decompose carbonates and bicarbonates during synthesis of new stable minerals of the barite, apatite, and pyromorphite families in soils (as shown in Table I). Decomposition of carbonates and bicarbonates is usually associated with the evolution of carbon dioxide, formation of hydroxyl group, (OH—), and the release of water molecules. As the water evaporates and carbon dioxide molecules are lost to the atmosphere, the treated waste mass and volume are decreased significantly.

The solid sulfate powder and the phosphate-supplying reagent are added to contaminated soil and solid waste material having a typical moisture content ranging from about 10 percent to about 40 percent by weight. At a moisture level within the foregoing range, the curing time of the treated materials is approximately 4 hours, which provides adequate time for chemical reactions to occur and immobilize the leachable lead species. Crystals of various lead mineral species begin to form immediately, but will continue over long time periods with an excess of treatment chemicals present. This contributes to "self-healing," as noted during treatability studies as well as full scale treatment operations.

Under the foregoing conditions, the immobilization of leachable lead occurs in a relatively dry environment because no wet byproducts, slurries or wastewater are produced by the process of the present invention. Operation of the process under relatively dry conditions beneficially allows cost-efficient handling of the contaminated soils and the waste materials. This allows compliance with Paint Filter Test for solid wastes required by USEPA and RCRA approved solid waste landfill facilities. Effective mechanical mixing, as by a pug mill or other such mixing device, eliminates the need for diffusion in the nonaqueous solid waste matrix.

The water resistant and insoluble lead minerals synthesized in soils and solid wastes according to this process are stable, and would behave like naturally occurring rock phosphates and hard sulfates. A list of these synthetic lead mineral species and complexes is presented in Table I below, in order of the relative abundance found during characterization of treated soil by x-ray florescence spectrometry, polarized light microscopy (PLM) and scanning electron microscopy (SEM).

TABLE I

Synthetic Mineral Species of Lead Detected in a Treated Sample (Listed in Decreasing Order of Abundance)

| | |
|---|---|
| 31–41% | Calcium Substituted Hydroxy Lead Apatites, $Ca_{0.5-1.5}Pb_{3.5-4.5}(OH)(PO_4)_3$ |
| 28–29% | Mixed Calcium Lead Phosphate Sulfates, $Ca_{0.05-0.2}Pb_{0.8-0.95}(PO_4)_{0.15-0.5}(SO_4)_{0.25-0.75}$ |
| 22–22% | Mixed Calcium Anglesites, $Ca_{0.05-0.3}Pb_{0.7-0.95}SO_4)$ |
| 3–6% | Anglesites, $PbSO_4$ |
| 2–7% | Lead Hydroxy/Chlor Apatite, $Pb_5(PO_4)_3(OH)_{0.5}Cl_{0.5}$ |
| 1–3% | Pyromorphite, $Pb_3(PO_4)_2$ |
| 1–2% | Organo-Lead Phosphate Sulfate, $Humus-o-Pb_3(PO_4)(SO_4)$ |

Some of the chemical reactions that occur during the curing stage, and lead to the development of mixed minerals containing both sulfates and phosphates, are illustrated in equations (4) and (5).

Mixed Calcium Lead Phosphate Sulfate

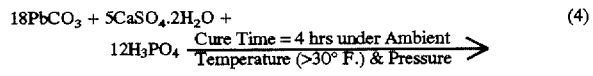

$20Ca_{0.1}Pb_{0.9}(PO_4)_{0.5}(SO_4)_{0.25} + Ca_3(PO_4)_2 + 18CO_2 + 28H_2O$

Organo-Lead Phosphate Sulfate

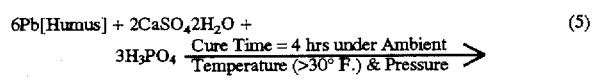

$Ca(9H)[Humus]-Pb_3(PO_4 + SO_4 +$

Anglesite Pyromorphite (Ca substituted)

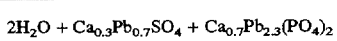

$2H_2O + Ca_{0.3}Pb_{0.7}SO_4 + Ca_{0.7}Pb_{2.3}(PO_4)_2$

The process of the present invention beneficially decreases the volume of the waste materials through: (i) the evolution of carbon dioxide during the chemical decomposition of carbonates and bicarbonates, upon reaction with the acidic components in gypsum and phosphoric acid, and (ii) hardening and chemical compaction as a result of the synthesis of new minerals which result in changes in interstitial spaces and interlattice structures. Applications of the process on a lead contaminated soil was associated with pore space decrease from 38.8% to 34.3% by volume. A decrease in pore space was associated with increased compaction of the treated soils and a decrease in overall waste volume ranging from 21.4% to 23.0%. For different waste types, the volume decrease varies with the amount of treatment chemicals used in the process. In another lead toxic solid waste, application of this process resulted in a volume decrease of the order of 36.4% while decreasing the leachable lead to levels below the regulatory threshold.

This reduction in volume of the contaminated soil and the solid waste material makes the process of the present invention particularly beneficial for off-site disposal in a secured landfill by cutting down the costs of transportation and storage space. The process can be accomplished at a cost-efficient engineering scale on-site or off-site for ex-situ treatment of lead-toxic solid wastes. This innovative treatment technology also offers a great potential for in-situ application to immobilize lead most economically without generation of any wastewater or byproducts.

Figure 3:
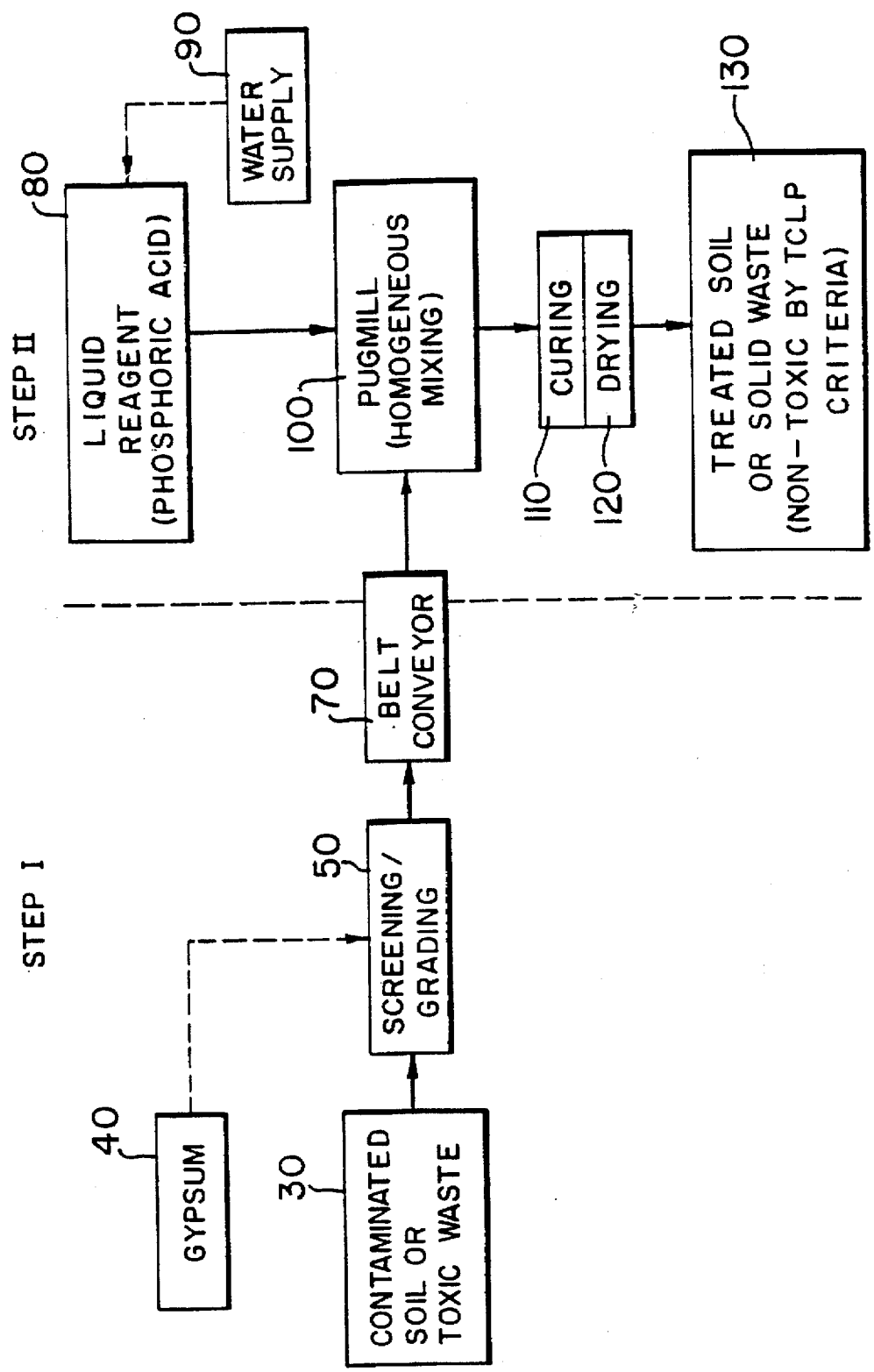
FIG. 3 exhibits an embodiment of the invention which mixes gypsum and a liquid reagent to treat contaminated soil or toxic waste.

FIG. 3 illustrates schematically the process of the present invention. The lead-contaminated uncontrolled hazardous waste site 10 with lead-toxic wastes is subject to excavation and segregation 20 of waste piles based on their total lead and TCLP lead contents into (a) heavily contaminated pile 30A, (b) moderately contaminated waste pile 30B and (c) least contaminated waste pile 30C. The staged soil and solid waste material in piles 30A, 30B and 30C is subjected to grinding, shredding, mixing 40 and screening 50 through an appropriately sized mesh sieve. The screening yields particles that are usually less than 5 inches in diameter for mixing with gypsum powder 60 in a grizzly that allows a uniform coating of gypsum over the soil particles and waste aggregates during the grinding, shredding and/or mixing step. Alternatively, as shown by the dashed line, gypsum powder 10 may be added continuously to the screened solid waste material in prescribed amounts as determined during treatability trials. Most of the leachable lead binds chemically with gypsum at molecular level to form lead sulfate, which crystallizes into a synthetic nucleus of mixed calcium anglesite and pure anglesite minerals identified in the treated material by chemical microscopy techniques.

The gypsum-coated waste particles and aggregates are then transported on a belt conveyor 70 or other conveying means to an area where an effective amount of phosphoric acid solution 80 of specified strengths in water 90 is added or sprayed just prior to thorough mixing in a pug mill 100 (or other mixing means). The temperature of the phosphoric solution is preferably maintained above 30° F. to prevent it from gelling. The treated soil and wastes are subject to curing 110 and drying 120 on a curing/drying pad, or may less preferably be cured and dried using thermal or mechanical techniques. The end product of the process passes the Paint Filter Test. During the curing time of about four hours, various "super-hard phosphate" mineral species, such as calcium-substituted hydroxy lead-apatites and mixed calcium-lead phosphate-sulfate mineral species, are formed in treated waste media 130. Crystals of these mineral species (in early stages of development) have been identified in the treated soil materials and solid wastes by geo-chemical and microscopy techniques like PLM and SEM.

The proportions of waste materials and reagents used in the process may be varied within relatively wide limits. For example, the amount of gypsum powder should be sufficient to produce lead sulfate in contaminated solid or solid waste material. In addition, the amount of phosphate-supplying reagent is prescribed in an amount sufficient to produce mineral species such as hydroxy-lead apatite in contaminated soil or solid waste material during a relatively short curing time of 4 hours, usually ranging from about 3 to about 5 hours. Further drying of the treated material may take 24 to 96 hours, but has not been required in any application to date. Table II documents the optimum curing time of 4 hours for the process. In all instances, the leachable lead as measured by the EP Toxicity Test Procedure was found below 0.6 mg/l and the differences between analytical values below this level and statistically insignificant.

TABLE II

Documentation of Optimum Curing Time
Using EP Toxicity Test criteria for lead fixation

| Waste | EP Toxic Pb (Untreated Sample) mg/l | EP Toxic Pb Concentration in mg/l found in processed sample at a Curing Time of | | |
|---|---|---|---|---|
| Matrix Category | | 4 Hrs. mg/l | 48 Hrs. mg/l | 96 Hrs. mg/l |
| Pb Toxic Soil A | 495 | 0.4 | 0.4 | 0.6 |
| Pb Toxic Soil B | 46 | 0.3 | 0.2 | 0.2 |
| Pb Toxic Soil C | 520 | 0.3 | 0.5 | 0.5 |

The amount of the gypsum powder and the phosphoric acid employed will be dependent on the amount of contaminant present in the soil, initial characteristics of the solid waste material, whether the material is in-situ or is excavated and brought to an off-site facility for treatment; the same is true for other sulfate compounds and phosphate reagents. The following Example I describes various ratios of the chemical reagents for application to the excavated lead-contaminated solid wastes in order to render the leachable lead substantially insoluble; i.e., to reduce the leachable lead to levels below 5.0 mg/l by EP Toxicity Test lead and TCLP Test criteria now in force under current land-ban regulations.

When the present invention is used to treat radionuclides and other radioactive materials, the amounts of treatment chemicals added are a function of the contaminated host matrix geochemistry, the concentration of radionuclides in the host matrix, and the presence of potential interferences that could inhibit the reactions, and the geotechnical properties of the host material. A preferred rate of TGPA addition is in the range of 0.1 to 20% by weight of the matrix to be treated. Preferred water content will also vary with the characteristics of the host material to be treated, but should be in the range of 5% to 50% by weight. Water content may affect the rate of reaction with lower water content requiring longer reaction periods and increased need for supplemental mixing. Higher water content, on the other hand, may adversely impact subsequent material handling, and volume reduction results. Water supplied to an excess will yield a material that will contain free liquids. In these cases, the treated material should be allowed to react for a longer period of time to permit a decrease in moisture content by capillary drying and/or evaporation. In some instances, dewatering or other drying techniques may be used to form a material that contains no free liquids.

When TGPA is not utilized as the group two treatment chemical reagent, other compounds that provide soluble phosphates, or phosphates that can be solubilized may be substituted. The phosphates may be applied in a liquid form or as a solid. Prior to employing the process of the present invention at a site, laboratory tests should be conducted to determine the amounts of group one and group two treatment chemicals that will be needed for the contaminated matrix that is to be treated. Identification of carbonates, borates, sulfates, silicates and/or phosphates in the host material will facilitate the selection of the optimum quantities of treatment chemicals.

Temperature and Pressure

Ambient temperature and pressure may be used for the disclosed treatment process, permitted the operations of the feeding and mixing equipment allow such. Under sub-freezing conditions, phosphoric acid may be heated to 50° F to prevent it from gelling and in order to keep it in a pumpable viscosity range.

Treatment System Design

The treatment may be performed under a batch or continuous system of using, for example, a weight-feed belt or platform scale for the metal-hazardous waste materials and a proportionate weight-belt feed system for the dry ingredient or ingredients and powders of at least one of the groups. A metering device, e.g., pump or auger feed system, may instead, or additionally, be used to feed the ingredients of at least one of the groups. The same equipment used for treating metal-hazardous waste material is used for treating soils and waste materials contaminated with radionuclides and other radioactive substances.

EXAMPLE 1

Single Step Mixing of Treatment Chemicals

A lead contaminated soil from a battery cracking, burning, and recycling abandoned site was obtained and treated with group one and group two chemicals in one single step at bench-scale. The contaminated soil contained total lead in the range of 11.44% to 25.6% and TCLP lead in the range of 1781.3 mg/l to 3440 mg/l. The bulk density of contaminated soil was nearly 1.7 g/ml at moisture content of 10.3%. The contaminated soil pH was 5.1 with an oxidation reduction potential value of 89.8 mV. To each 100 g lot of lead hazardous waste soil, sufficient amounts of group one and group two treatment chemicals and reagents were added as illustrated in Table III, in order to render it non-hazardous by RCRA (Resource Conservation and Recovery Act) definition.

TABLE III

| Test Run | Treatment Additive(s) | TCLP Lead (mg/l) |
|---|---|---|
| I | 5% lime, 5% gypsum, 10.2% phosphoric | 0.5 |
| II | 12% phosphoric, 10% potassium sulfate | 2.2 |
| III | 12% phosphoric, 10% sodium sulfate | 3.5 |
| IV | 15% TSP | 3.7 |
| V | 12% phosphoric, 10% Portland Cement I | 0.2 |
| VI | 12% phosphoric, 10% Portland Cement II | 0.9 |
| VII | 12% phosphoric, 10% Portland Cement III | 0.3 |
| VIII | 12% phosphoric, 10% gypsum | 4.6 |
| IX | 15% TSP, 10% Portland Cement I | 0.1 |
| X | 15% TSP, 10% Portland Cement II | 0.2 |
| XI | 15% TSP, 10% Portland Cement III | 0.2 |
| XII | 15.1% phosphoric | 3.6 |
| XIII | 10% trisodium phosphate, 10% TSP | 1.2 |
| XIV | 6.8% phosphoric, 4% TSP | 4.5 |
| XV | 10% gypsum | 340 |
| XVI | 12% phosphoric, 5% lime | 0.9 |
| Control | Untreated Check | 3236.0 |

It is obvious from TCLP lead analyses of fifteen test runs that the single step mixing of at least one component of either or both group one and group two treatment chemicals is very effective in diminishing the TCLP lead values. In test run I, mixing of lime land gypsum from group one additives and phosphoric from group two decreased the TCLP lead to levels below 1 mg/l from 3440 mg/l with a curing time of less than 5 hours. Although the treatment chemicals of group two are more effective in decreasing the TCLP lead than the treatment chemicals of group one, as illustrated by the comparison of test runs XII and XV for this waste soil, but the combined effect of both groups is even more pronounced in decreasing the leachable lead. Results of these bench-scale studies were confirmed during engineering-scale tests. Single step mixing of 5% lime, 11.76% phosphoric acid and 15% water in a 2000 g hazardous soil diminished the TCLP lead values from 3440 mg/l to 0.77 mg/l in less than 5 hours. Likewise, single step mixing of 300 g Triple Super Phosphate (TSP), 200 g Portland Cement (PC) and 300 ml water in 200 g hazardous soil decreased the TCLP lead to levels below 0.3 mg/l within a relatively short curing time. Single step mixing of both groups of treatment chemicals can dramatically reduce treatment costs making this invention highly attractive and efficient for commercial use.

The first advantage of using lime and phosphoric acid combination over the use of TSP and PC is that in the former a volume decrease of 6% was realized when compared to the original volume of untreated material. In the later case, a volume increase of 37% was measured due to hydration of cement. The second advantage of using phosphoric and lime combination is that the mass increase is less than the mass increase when TSP and PC are added. Quantitatively, the mass increase in this hazardous waste soil treatment was approximately 16.7% due to combination of lime and phosphoric whereas the mass increase was about 40% due addition of TSP and PC. And therefore, those skilled scientists and engineers learning this art from this patent, must make an economic judgement for each lead contaminated process material and waste stream which chemical quantity from each group would be most effective in rendering the treated material non-hazardous.

The third advantage in using lime and phosphoric over the use of TSP and PC is that the former does not change in physical and mechanical properties of original material and if a batch fails for shortage of treatment chemicals, it can be retreated rather easily by adding more of the treatment reagent. The material treated with PC hardens and may form a monolith which is difficult to retreat in case of a batch failure.

EXAMPLE 2

Interchangeability of Two Step Mixing Method

In the lead contaminated soil from the abandoned battery recycling operations, the treatment chemicals of either group can be added first and mixed thoroughly in an amount sufficient to decrease the TCLP lead below the regulatory threshold. Two step mixing method of the group one and group two treatment additives is as effective as single step mixing of same quantity of treatment chemicals selected from group one and group two.

Table IV illustrates data that confirm that the application of group one treatment chemicals in step I is about as effective as application in step II. The same is true for group two treatment chemicals. Thus, the two steps are essentially interchangeable. The reversibility of the steps according to the present invention make it very flexible for optimization during commercial use, scaling up and retreatment of any batches that fail to pass the regulatory threshold criteria.

TABLE IV

| Test Run | Treatment Additives | | Total Lead % | TCLP Lead mg/l |
|---|---|---|---|---|
| | Two Step Mixing Methods | | | |
| | Step I | Step II | | |
| I | 10% gypsum & 2% lime (Group I) | 12% phosphoric acid (Group II) | 20.8 | 1.8 |
| II | 12% phosphoric (Group II) | 10% gypsum & 2% lime (Group I) | 24.4 | 1.9 |
| III | 10% gypsum (Group I) | 10.6% phosphoric (Group II) | 24.4 | 3.4 |
| IV | 10.6% phosphoric (Group II) | 10% gypsum (Group I) | 22.4 | 3.5 |
| | Single Step Mixing Method | | | |
| V | 10% gypsum and 12% phosphoric | | 23.6 | 3.5 |
| Untreated | Control/Check | | 23.1 | 3440 |

EXAMPLE 3

Retreatability and Single Step Mixing

A sample of hazardous cracked battery casings of ½"–1" size containing 14% to 25.2% total lead and about 3298 mg/l of TCLP was obtained for several test runs of the invention to verify the retreatability of batches that fail because of the insufficient dose of treatment chemical added. The results of initial treatment and retreatment are presented in Table V and compared with single step mixing treatment additives from both groups. About 200 g of hazardous material was treated with 10.5% phosphoric acid, 2.5% gypsum and 1.25% lime, all mixed in one single step. The TCLP lead was decreased from 3298 mg/l to 2.5 mg/l as a result of single step mixing in test run V (TABLE V).

When the amount of additive from group two was less than the optimum dose needed, the TCLP lead decreased from 3298 mg/l to (i) 1717 mg/l when 4.2% phosphoric and 1% lime were added during step I and II respectively and (ii) 2763 mg/l when 4.2% phosphoric and 5% gypsum were added, compared to untreated control.

Since the TCLP lead did not pass the regulatory criteria of 5 mg/l, treated material from test run I and II was retreated during test run III and IV, respectively, using sufficient amounts of phosphoric acid (an additive from group two) in sufficient amount to lower the TCLP lead to 2.4 mg/l and 2.5 mg/l, respectively. Furthermore, this example confirms that lime is more effective in decreasing TCLP lead than gypsum among different additives of group one. And as a result, the requirement of group two treatment reagent is lessened by use of lime over gypsum. The example also illustrates that one or more compounds of the same group can be used together to meet the regulatory threshold limit.

TABLE V

| Test Run | Treatment Additives | | TCLP Lead mg/l |
|---|---|---|---|
| | Two Step Mixing Methods | | |
| | Step I | Step II | |
| I | 4.2 phosphoric | 1% lime | 1717 |
| II | 4.2% phosphoric | 5% gypsum | 2763 |
| Untreated Control | | | 3296 |
| | Retreatment (Single Step Mixing) Method | | |
| III-I | 6.8% phosphoric | | 2.4 |
| IV-II | 8.5% phosphoric | | 3.5 |
| | Single Step Mixing | | |
| V | 10.5% phosphoric, 2.5% gypsum, 1.25% lime | | 2.5 |

EXAMPLE 4

Wide Range of Applications and Process Flexibility in Curing Time, Moisture Content and Treatment Operations TABLE VI illustrates different types of waste matrix that have been successfully treated employing the one step and two step mixing treatment additives from group one and group two. For these diverse waste types and process materials, total lead ranged from 0.3% to 23.5%. This example discloses the flexibility and dynamics of the treatment process of the invention in rendering non-hazardous, by RCRA definition, a wide range of lead-hazardous and other metal-hazardous materials within a relatively short period of time, usually in less than 5 hours. It is expected that this process will also render bismuth, cadmium, zinc, chromium (III), arsenic (III), aluminum, copper, iron, nickel, selenium, silver and other metals also less leachable in these different types of wastes. The moisture content of the waste matrix is not critical and the invented process works on different process materials and waste types independent of the moisture content. The treatment operations can be carried out at any level—bench, engineering, pilot and full-scale, on relatively small amounts of hazardous waste material in laboratory to large amounts of contaminated process materials, soils, solid wastes, waste waters, sludges, slurries and sediments outdoor on-site. The process is applicable in-situ as well as ex-situ.

Although the present invention has been described in connection with preferred embodiments, it will be appreciated by those skilled in the art that additions, modifications, substitutions and deletions not specifically described may be made without departing from the spirit and scope of the invention defined in the appended claims.

TABLE VI

UNIVERSE OF APPLICATION FOR THE INVENTION MAECTITE TREATMENT PROCESS

| LEAD CONTAMINATED WASTE TYPE | TREATMENT ADDITIVE | TOTAL LEAD % | LEACHABE LEAD (MG/L) Before Treatment | LEACHABE LEAD (MG/L) After Treatment | VOLUME DECREASE % |
|---|---|---|---|---|---|
| OLD DIRT | 3.4% Phosphoric* | 2.2 | 164.4 | 1.5 | 16.7 |
| WASTE WITH BROKEN BATTERY CASING | 8.1% Lime 1% Gypsum and 3.4% Phosphoric | 2.7 | 197.5 | ND (<.5) | |
| SLAG-LEAD SMELTER | 10.2% Phosphoric | 6.6 | 21.3 | 2.0 | |
| LEAD-BIRD SHOT | 16% Phosphoric 14% Lime and 30% Gypsum | 16.1 | 3720 | ND (<.5) | |
| LEAD-BUCK SHOT | 16% Phosphoric 14% Lime and 28% Gypsum | 11.4 | 1705 | ND (<.5) | |
| BATTERY CASINGS | 5% Gypsum | 12 | 288 | 0.6 | -0- |
| ORGANIC HUMUS SOIL | 0.5% Lime 2.0% Phosphoric | 1.9 | 23.2 | ND (<.5) | 29 |
| 50:50 MIXTURE OF CASINGS AND SAND | 4% Gypsum 4% Phosphoric | .5 | 687 422.2 | 0.7 0.95 | 3.3 23.6 |
| SOLID WASTE SOIL Contaminated With Tetrethyl lead | 3% Lime 12% Phosphoric | 23.5 | 12.0 | 6.0 | |
| SOIL CONTAMINATED WITH LEADED GASOLINE | 10% Gypsum 6% Phosphoric 3% Lime 5.1% Phosphoric | 4.74 3.2 | 590 213 | 3.7 1.6 | |
| CARBON WITH LEAD DROSS | 4.7% Phosphoric | 12.6 | 105.6 | 0.5 | |
| WIRE FLUFF | 1.7% Phosphoric | 0.3 | 19 | 0.7 | |
| WIRE CHIP | 0.75% Phosphoric | 0.4 | 28 | ND (<.2) | |
| LAGOON SEDIMENT | 0.6% TSP 0.5% Phosphoric | 0.3 | 3.9 5.6 | 0.23 0.3 | |
| SLUDGE-INDUSTRIAL WASTE | | 2.2 | 59.3 | 1.6 | |
| RCRA ORGANIC SLUDGE | 0.6% Phosphoric 10% Gypsum | 9.4 | 580 | ND (<.5) | |
| FILTER CAKE | 8.5% Phosphoric | 2.9 | 245.3 | 1.1 | |
| GRAVEL | 5% Gypsum 2.2% Phosphoric | 0.16 | 7.5 | 0.5 | |

TABLE VI-continued

UNIVERSE OF APPLICATION FOR THE INVENTION MAECTITE TREATMENT PROCESS

| LEAD CONTAMINATED WASTE TYPE | TREATMENT ADDITIVE | TOTAL LEAD % | LEACHABE LEAD (MG/L) Before Treatment | LEACHABE LEAD (MG/L) After Treatment | VOLUME DECREASE % |
|---|---|---|---|---|---|
| ROAD GRAVEL | 10% Gypsum 8.4% Phosphoric | 0.34 | 46 | ND (<.5) | |
| MIXTURE OF BATTERY CASINGS (SOLIDWASTE) AND SOIL | 2.5% Gypsum 3.4% Phosphoric | 1.3 | 75 | 0.6 | 19.6 |
| INDUSTRIAL WASTE (B) | 1 g Lime 3.4% Phosphoric | 2.75 | 91 | 0.7 | |
| INDUSTRIAL PROCESS MAT. (G) | 3.4% Phosphoric | 1.3 | 61 | ND (<.5) | |
| SOIL (B) | 3.4% Phosphoric | 4.1 | 129.5 | 0.6 | 25.6 |
| SOIL (S) | 50% Gypsum | 11 | <0.01 | | |
| SOIL (O) | 1.3% Phosphoric | 0.38 | 34.6 | ND (<.5) | |
| SOIL (C) | 5% Lime 8.5% Phosphoric | 11.78 | 130.6 | 0.33 | |
| BATTERY CASINGS | 5% Gypsum 3.4% Phosphoric | 2.5 | 110.1 | 1.9 | |
| GRAY CLAY SOIL | 5% Trisodium Phosphate | 2.2 | 46.6 | 0.2 | |

EXAMPLE 5

Nearly twenty (20) different chemicals and products from various vendors and supply houses were screened for chemical fixation of leachable lead in hazardous solid waste samples. Only six (6) of these treatments chemicals were found effective in decreasing the leachable lead as measured by: (1) the EP Toxicity Test and (2) the TCLP Test. Table VII presents a summary of leachable lead found in untreated and treated waste samples allowed to cure for a minimum of 4 hours after treatment with at least one of the effective chemicals. Treatment chemicals found relatively ineffective for lead fixation included a variety of proprietary products from American Colloid Company and Oil Dri, different sesquioxides like alumina and silica, calcium silicate, sodium silicate, Portland cement, lime, and alum from different vendors. Results for these ineffective chemicals are not shown in Table VII.

TABLE VII

Relative effectiveness of various treatment chemicals screened to decharacterize the lead-toxic solid wastes

| | Treatment Chemical (Step) | Leachable Lead in mg/l Toxicity Test | Leachable Lead in mg/l EP TCLP Test |
|---|---|---|---|
| I. | Untreated Control | 221.4 | 704.5 |
| II. | Single Treatment Chemical (One Step Treatment) | | |
| | a. Sulfuric Acid (I) | 11.7 | 39.8 |
| | b. Phosphoric Acid (I) | 1.0 | 5.9 |
| | c. Superphosphate Granular (I) | 2.7 | 11.4 |
| | d. Liquid Phosphate Fertilizer (I) | 19.4 | 64.3 |
| | e. Gypsum Powder (I) | 24.9 | 81.8 |
| | f. Sodium Phosphate (I) | 28.7 | 93.9 |
| III. | Two Step Treatment | | |
| | g. Sulfuric (I) & Lime (II) | 20.6 | 68.1 |

TABLE VII-continued

Relative effectiveness of various treatment chemicals screened to decharacterize the lead-toxic solid wastes

| | Treatment Chemical (Step) | Leachable Lead in mg/l Toxicity Test | Leachable Lead in mg/l EP TCLP Test |
|---|---|---|---|
| | h. Gypsum Powder (I) & Alum (II) | 3.9 | 15.3 |
| | i. Sodium Phosphate (I) & Phosphoric (II) | 3.1 | 12.6 |
| | j. Gypsum (I) & Phosphoric (II) | N.D.* | 1.6 |
| IV. | Three Step Treatment | | |
| | k. Gypsum (I), Alum (II) & Sodium Phosphate (III) | 12.8 | 43.3 |
| | l. Gypsum (I), Phosphoric (II) & Sodium Phosphate (III) | N.D.* | 1.4 |

*N.D. means non-detectable at <0.50 mg/l.

Evaluation of a single treatment chemical in one step reveals that phosphoric acid was most effective in fixation of leachable lead followed by granular super-phosphate, a fertilizer grade product available in nurseries and farm supply houses. However, neither treatment effectively treated leachable lead to the USEPA treatment standard of 5.0 mg/l by TCLP methodology.

Although both phosphoric acid and granular superphosphate were effective in meeting the now obsolete EP Toxicity Test criteria at 5.0 mg/l, this test has been replaced by TCLP Test criteria for lead of 5.0 mg/l. Single application of the phosphoric acid, granular superphosphate or any other chemical was short of meeting the regulatory threshold of 5.0 mg/l by TCLP Test criteria for lead.

In a two-step treatment process, application of gypsum during Step I and treatment with phosphoric acid in Step II resulted in decrease of TCLP-lead consistently and repeatedly below the regulatory threshold of 5.0 mg/l. The results of this two-step treatment process utilizing gypsum in Step I and phosphoric acid in Step II are most reliable and hence, the two-step process may be applied to a wide variety of lead contaminated wastes as exhibited in Example 2.

A three-step process, as set forth in Table VII, was not perceived to be as economically viable as a two-step treatment process, despite its ability to reduce lead levels in satisfaction of the TCLP Test criteria. A process that employees the beneficial combination of treatment first with a sulfate compound and then with a phosphate reagent in accord with the present invention, in combination with one or more additional treatment steps, may nevertheless be within the scope of the invention.

In order to illustrate the relative proportions of two chemicals, e.g., gypsum and phosphoric acid, needed for treatment of lead-toxic wastes, three soil samples from a lead contaminated test site were processed using the present invention, in which gypsum powder was used in the first step, and phosphoric acid solution in water at concentrations of about 7, 15 and 22 percent by weight in the second step. The soil was measured for lead content in accordance with the EP Toxicity Test before and after treatment. A level of leachable lead below 5 mg/l was considered non-hazardous according to this procedure. During these test runs, the EP Toxicity Test criteria were in force for treated waste material. The results of these tests are set forth in Table VIII:

TABLE VIII

Effectiveness in Fixation and Stabilization of Leachable Lead in Lead Toxic Soils

| | PROCESS STEPS | | EP TOXIC LEAD TEST RESULTS | |
|---|---|---|---|---|
| Soil Sample (Lead-toxic waste) | Gypsum Step I (g/kg soil) | Phosphoric Step II (g/kg soil) | Before Treatment mg/l | After Treatment mg/l |
| 1. Low lead contamination | 20 | 10 | 8 | <0.1 |
| 2. Moderate contamination | 30 | 20 | 61 | <0.1 |
| 3. High lead contamination | 40 | 30 | 3,659 | 1.7 |

The foregoing results demonstrate that the process of the present invention was effective in all three samples, representing 3 different levels of lead contamination. The process is flexible and is usually optimized during bench scale treatability studies for each waste type to immobilize the leachable lead and to decharacterize or transform the lead-toxic waste into non-toxic solid waste acceptable to TSD facilities under current land ban regulations. A net reduction of 36.4% in waste volume through use of the instant process has been observed. Typical volume reductions are set forth in Table IX.

TABLE IX

Changes in Solid Waste Volume as a Result of Treatment with the Two-Step Process

| | SOLID WASTE VOLUME | | |
|---|---|---|---|
| LEAD-TOXIC SOIL/ SOLID WASTE MATERIAL (Treatment Scale) | Initial (Before Application of Process) | Final (After Application of Process and Curing) | Decrease in Waste Volume (%) |
| 1. Soil (Full scale) | 3850 cu. yd. | 2450 cu. yd. | 36.4 |
| 2. Solid Waste | | | |

TABLE IX-continued

Changes in Solid Waste Volume as a Result of Treatment with the Two-Step Process

| | SOLID WASTE VOLUME | | |
|---|---|---|---|
| LEAD-TOXIC SOIL/ SOLID WASTE MATERIAL (Treatment Scale) | Initial (Before Application of Process) | Final (After Application of Process and Curing) | Decrease in Waste Volume (%) |
| (Bench Scale) | | | |
| Test Run I | 106.1 cu. in. | 81.51 cu. in. | 23.0 |
| Test Run II | 22.0 cu. in. | 17.3 cu. in. | 21.4 |

The most profound effect of the process of the present invention is at a structural level, where the break-down of granular aggregates is associated with a loss of fluffiness and a decrease in pore space and increased compaction due to physical, mechanical and chemical forces at different levels. At a molecular level, phosphoric acid breaks down the minerals containing carbonates and bicarbonates, including cerussites, in stoichiometric proportions. Soon after the addition of phosphoric acid to a solid waste containing cerussites, extensive effervescence and frothing becomes evident for several minutes and sometimes for a few hours. The phosphoric acid breaks down the acid sensitive carbonates and bicarbonates leading to the formation of carbon dioxide, water and highly stable and insoluble sulfate and phosphate mineral compounds. Thus, structural changes due to interlattice reorganization as well as interstitial rearrangement in waste during processing are associated with an overall decrease in waste volume. Depending on the extent of carbon dioxide loss from the breakdown of carbonates and bicarbonates present in the lead-toxic solid waste, the process may lead to a slight loss of waste mass as well. Water generated during the chemical reactions is lost by evaporation, which further decreases the mass and volume of the treated solid wastes and soils.

The cost of the process of the present invention is moderate to low, depending upon (i) waste characteristics, (ii) treatment system sizing, (iii) site access, (iv) internment of final disposition of treated material and (v) site support requirements. The costs of treatment and disposal are presently on the order of $115 per ton of lead-toxic waste, as compared to off-site conventional treatment and disposal costs of over $250 per ton if no treatment in accord with the invention had been performed. Moreover, recent land ban regulations would prohibit the disposal of all lead-toxic wastes in landfills. The foregoing Example makes clear that the process of the present invention provides an efficient technology that is economically attractive and commercially viable in meeting regulatory criteria for landfills.

EXAMPLE 6

The process of the present invention was applied on bench scale to five different lead-toxic waste materials that were characterized for total lead, TCLP-lead, moisture content and pH before and after treatment. A curing time of 5 hours was allowed for completion of the treatment process. The results compiled in Table X exhibit the profound effects of the process in decreasing the TCLP lead in a wide range of lead-toxic soils and solid wastes containing total lead as high as 39,680 mg/kg and TCLP lead as high as 542 mg/l. In each of the five cases, the instant process immobilizes the leachable lead to levels below the regulatory threshold of 5 mg/l set by the TCLP Test criteria for lead currently in force under the land ban regulations of the United States Environmental Protection Agency.

TABLE X

Typical changes in solid waste characteristics due to process effects

| SOLID WASTE CHARACTERISTICS | MEASURED VALUES | |
| --- | --- | --- |
| | Before Treatment | After Treatment & Curing |
| I. Lead-toxic SW-A | | |
| Total lead, % | 1.442 | 1.314 |
| TCLP-Lead, mg/l | 542.0 | 2.0 |
| Moisture, % | 23.0 | 33.0 |
| pH, S.U. | 8.1 | 4.8 |
| II. Lead-toxic SW-B | | |
| Total lead, % | 0.847 | 0.838 |
| TLCP-Lead, mg/l | 192.0 | 2.4 |
| Moisture, % | 27 | 36 |
| pH, S.U. | 8.0 | 5.3 |
| III. Lead-toxic SW-C | | |
| Total lead, % | 3.968 | 3.066 |
| TLCP-Lead, mg/l | 257.6 | 1.0 |
| Moisture, % | 10.0 | 18.1 |
| pH, S.U. | 7.2 | 4.5 |
| IV. Lead-toxic SW-D | | |
| Total lead, % | 2.862 | 2.862 |
| TLCP-Lead, mg/l | 245.3 | 0.38 |
| Moisture, % | 71.6 | 84.1 |
| pH, S.U. | 8.1 | 6.3 |
| V. Lead-toxic SW-E | | |
| Total lead, % | 0.16 | 0.12 |
| TLCP-Lead, mg/l | 7.5 | 1.87 |
| Moisture, % | 12.3 | 23.0 |
| pH, S.U. | 7.0 | 5.4 |

It is obvious from Table X that the instant process operates over a wide range of moisture and pH conditions. It is associated with 8 to 11% rise in moisture content. The end product of the treatment process may contain moisture in a typical range of 18% to 36% on a dry weight basis. The end product passes the Paint Filter Test for solids and there are not other byproducts or side streams generated during the process. The treated solid waste is cured in 4 to 5 hours and may be allowed to dry for 2 to 3 days after treatment for loss of unwanted moisture prior to final internment and disposition. This time is sufficient for the TCLP Tests to be completed as part of the disposal analysis under land ban regulations enforced by the USEPA.

It is necessary to establish the quantities of gypsum and phosphate reagent on a case-by-case basis, because the consumption of these materials will depend not only upon the initial lead level in the waste or soil, but also upon other waste characteristics such as cation exchange capacity, total buffering capacity, and the amounts of carbonates and bicarbonates present, among others. Bench scale treatability studies for each solid waste considered will be necessary to determine the optimum levels of the materials that are employed. The treatability studies are designed to optimize the amount and grade of gypsum powder (or other sulfate compound) needed during step I, and the amount and concentration of phosphoric acid (or other phosphate compound) needed in step II for cost-effective operation of the treatment system. Those skilled in the art are knowledgeable of such bench studies, which are usually carried out as precursors to full scale treatment.

Several series of studies were performed on host matrices containing leachable and soluble radionuclides and other radioactive substances using the present invention.

EXAMPLE 7

Sample material from a site in the eastern United States was homogeneously mixed in a container. The material consisted of silts, clays, sand and gravel mixed with glass; nails, rocks and debris. The material was collected from an environmental restoration project where site efforts focused on excavation, packaging, transportation and disposal of Thorium contaminated soil and materials from beneath residential homes.

Three 300 g sub-samples of untreated material were prepared from the sample material with the materials in each of the sub-samples sized to less than ⅜ inch and suitable for USEPA SW846 Method 1311 (TCLP) extraction. Sample 1 (US-1) was extracted using TCLP fluid No. 1, Sample 2 (US-2) was extracted using TCLP fluid No. 2, and Sample 3 (US-3) was extracted using laboratory grade deionized ("DI") water as the only modification to the EPA method. This soil characterization step was conducted for purposes of determining the most harsh extraction conditions for the untreated material. TCLP fluid No. 1 was prepared with glacial acetic acid and 1N NaOH with an end pH of 4.93±0.05 S.U. TCLP fluid No. 2 was prepared with glacial acetic acid and deionized water with an end pH of 2.88±0.05 S.U. The laboratory grade DI water had a pH of 6.82±0.05 S.U.

After tumbling 100 g of the 300 g sub-sample in 200 ml of extraction fluid for eighteen (18) hours at 30±2 rpm in a longitudinal rotary TCLP agitator, the extracts were decanted from the settled solids, filtered as per the method, and then placed in Marinelli containers. Radionuclide leachability was determined by conducting total gamma spectroscopy analysis on each extract in accordance with accepted quantification methods using a Nuclear Data Genie Model ND9900 Gamma Spectrometer integrated with a DEC Micro VAX II computer. Each extract was counted for sixteen (16) hours. All results presented below are in the units of picocuries per liter (pCi/l).

TABLE XI

Eastern United States Untreated Sample Material Characterization

| Radionuclide | US-1 Untreated TCLP Fluid 1 | US-2 Untreated TCLP Fluid 2 | US-3 Untreated Deionized Water |
| --- | --- | --- | --- |
| Pb-210 | 329 +/− 30 | 173 +/− 45 | 175 +/− 37 |
| Bi-211 | 2,751 +/− 736 | 3,360 +/− 797 | 3,451 +/− 560 |
| Bi-214 | 772 +/− 93 | 1,002 +/− 120 | 1,017 +/− 106 |
| Pb-214 | 810 +/− 350 | 910 +/− 242 | 966 +/− 202 |
| Fr-223 | 2,183 +/− 660 | 3,768 +/− 73 | 3,228 +/− 531 |
| Ra-223 | 939 +/− 404 | 1,514 +/− 383 | 714 +/− 148 |
| Ra-224 | 1,551 +/− 503 | 1,772 +/− 358 | 1,868 +/− 321 |
| Ra-226 | 1,090 +/− 167 | 1,294 +/− 162 | 1,352 +/− 156 |
| Ac-227 | 213 +/− 20 | 243 +/− 54 | 173 +/− 31 |
| Th-227 | 533 +/− 163 | 921 +/− 179 | 788 +/− 131 |
| Th-228 | 8,335 +/− 1014 | 16,490 +/− 12 | 13,170 +/− 1,371 |
| Pa-231 | 1,136 +/− 476 | 1,764 +/− 467 | 1,490 +/− 307 |
| Th-234 | 22 +/− 6 | 19 +/− 13 | 10 +/− 9 |
| U-235 | 190 +/− 22 | 313 +/− 38 | 281 +/− 29 |

As shown by the gamma spectral analysis of each extract, TCLP fluid No. 2 was identified as the most rigorous extraction fluid for the soil material, primarily because of leachable Thorium and Uranium levels. This fluid was then selected to be used for extraction of the treated samples for the remainder of the studies.

In the second portion of the study, two (2) 300 g samples were prepared from the eastern U.S. sample material and labeled as TS-1 and TS-2. Each sample was placed in a laboratory beaker and 35 ml of deionized water and 5% (TS-1) and 10% (TS-2) by weight TGPA were added. The contents in each of the beakers were then mixed by folding with a laboratory spatula in order to simulate blending achievable using full-scale methods in the field. The samples were then allowed to react overnight. Each beaker was then sub-sampled, material particles sized to less than ⅜ inch, and prepared for USEPA SW-846 Method 1311 (TCLP) extraction using 100 g of treated sub-sample material and 2000 ml TCLP Fluid No. 2. Table XII presents the data from the gamma spectral analysis with all units reported as pCi/l. The results from Table XI for untreated materials extracted using TCLP Fluid No. 2 were used as a control and are shown in the fourth column.

TABLE XII

Eastern United States Sample Material
Treated with DI Water and TGPA
TCLP Extraction Fluid No. 2 Results

| Radio-nuclide | TS-1 5% TGPA | TS-2 10% TGPA | US-2 TCLP Fluid No. 2 |
|---|---|---|---|
| Pb-210 | <MDA* | <MDA | 173 +/− 45 |
| Bi-211 | <MDA | <MDA | 3,360 +/− 797 |
| Bi-214 | <MDA | <MDA | 1,002 +/− 120 |
| Pb-214 | <MDA | <MDA | 910 +/− 242 |
| Fr-223 | <MDA | <MDA | 3,768 +/− 73 |
| Ra-223 | <MDA | <MDA | 1,514 +/− 383 |
| Ra-224 | <MDA | <MDA | 1,772 +/− 358 |
| Ra-226 | <MDA | <MDA | 1,294 +/− 162 |
| Ac-227 | <MDA | <MDA | 243 +/− 54 |
| Th-227 | <MDA | <MDA | 921 +/− 179 |
| Th-228 | <MDA | <MDA | 16,490 +/− 12 |
| Pa-231 | <MDA | <MDA | 1,764 +/− 467 |
| Th-234 | <MDA | <MDA | 19 +/− 13 |
| U-235 | <MDA | <MDA | 313 +/− 38 |

*<MDA = less than the calculated Minimum Detectable Activity for the counted sample. MDA is the smallest amount of activity that can be detected in a sample.
Data from TS-1 was corroborated by a second laboratory on duplicate sample extract for QA/QC data validation purposes.

As indicated by the data from Tables XI and XII, TGPA substantially reduces the leachability of radionuclides in soil as determined by USEPA SW-846 Method 1311 (TCLP) extraction with fluid No. 2 and gamma-spectral analysis of resultant extract. It should be noted that the soil sample materials were not sized to less than ⅜ inch until after the TGPA and deionized water were mixed and allowed to cure overnight.

The leaching of Thorium, its decay-daughters, and other radionuclides from untreated material was effectively reduced by the addition of TGPA to the material. The treated material was moist after curing overnight, but contained no free liquids. After exposure to the air for forty-eight (48) hours, the treated material was dry and crumbly with non-uniform cohesivity. Volume reduction was observed, but not quantified.

EXAMPLE 8

In another study, samples of the untreated material used in Example 7 were mixed with TGPA and other compounds. For this study, gypsum, calcium oxide, triple superphosphate (TSP), and TGPA were selected based upon a generally desired pH range of the end product. Four 300 g samples were prepared: TS-3=35 ml DI water+8% gypsum+5% TGPA; TS-4=35 ml Di water+9% calcium oxide+8% TGPA; TS-5=35 ml DI water+3% calcium oxide+5% TGPA; and TS-6=45 ml DI water+10% TSP+1.6% calcium oxide.

Treatment samples received variable amounts of water so that after mixing, the consistency of the mixtures was uniform for all of the samples and there were no free liquids. The water assisted in the dispersement of the reagent and calcium oxide hydration; and hence, the disassociation of the phosphate to a soluble form. Additional water was required in TS-6 because of the solid reagent forms and the hydration demand of CaO in the presence of dry TSP.

Table XIII presents the data from USEPA SW-846 Method 1311 (TCLP) extracts of TS-3, TS-4, TS-5, and TS-6 analyzed by total gamma-spectroscopy in accordance with procedures outlined in Example 7. All samples were analyzed with TCLP fluid No. 2 acetic acid+water with a pH of 2.88±0.05 S.U.).

TABLE XIII

Eastern United States Sample Material
Treated with Other Embodiments
TCLP Extraction Fluid No. 2 Results

| Radio-nuclide | TS-3 | TS-4 | TS-5 | TS-6 |
|---|---|---|---|---|
| Pb-210 | <MDA* | <MDA | <MDA | <MDA |
| Bi-211 | <MDA | 180 +/− 69 | 296 +/− 106 | <MDA |
| Bi-214 | <MDA | 55 +/− 23 | 75 +/− 29 | <MDA |
| Pb 214 | <MDA | <MDA | 50 +/− 50 | <MDA |
| Fr-223 | <MDA | <MDA | <MDA | <MDA |
| Ra-223 | <MDA | 245 +/− 97 | 84 +/− 34 | <MDA |
| Ra-224 | <MDA | <MDA | <MDA | <MDA |
| Ra-226 | <MDA | <MDA | 122 +/− 114 | <MDA |
| Ac-227 | <MDA | <MDA | 286 +/− 47 | <MDA |
| Th-227 | <MDA | <MDA | 552 +/− 131 | <MDA |
| Th-228 | <MDA | <MDA | <MDA | <MDA |
| Pa-231 | <MDA | <MDA | <MDA | <MDA |
| Th-234 | <MDA | <MDA | 139 +/− 53 | <MDA |
| U-235 | <MDA | <MDA | 79 +/− 35 | <MDA |

*<MDA = less than the calculated Minimum Detectable Activity (MDA) for the counted sample
Data from samples TS-3 and TS-6 was corroborated by a second laboratory on duplicate sample extracts for QA/QC data validation purposes.

As evidenced by the data, the treatment regimes utilizing gypsum+TGPA, calcium oxide+TGPA, and triple superphosphate (TSP)+calcium oxide resulted in the reduction of nuclide leachability. Each of the treatment regimes provided soluble phosphates, or phosphates that were solubilized by pH manipulation in the presence of a fluid. Each of the treatments resulted in the formation of Apatites within the host material, with mineral crystal nucleation chemically incorporating the radionuclides.

EXAMPLE 9

The tests in Example 9 were performed to study the volume change of materials treated by the process of the present invention. In Example 9, soil volume was examined prior to and after the addition of TGPA. Because of the difficulty in examining volume changes due to varied conditions, geometric configuration, and chemical properties of material differing between pre- and post-treatment, a special device was constructed to account for changes in density, moisture content, and geotechnical properties.

The test apparatus used for measuring the volume consisted of a removable stainless steel cylindrical cup with a flat bottom ("the cup"). The cup had a 10.3 cm inside diameter and a 29.6 cm inside height and mounted vertically to the base of the test apparatus. Mounted above the cup on the apparatus frame was a pneumatic piston with a 1.4 cm thick plate fixed to the piston shaft. When activated with compressed air, a 10.2 cm diameter close-tolerance plate fixed to the piston shaft extended downward and into the open end of the cup. Compressed air operated the piston and was adjusted with a valve so that from 1 to 100 psi could be exerted on soil placed within the Cup.

The untreated material from Example 7 was used to prepare ten aliquots (of approximately 100 g) which were individually weighed using a top-loading electronic balance (±0.01 g). The ten aliquots were then sequentially emptied into the cup. After the addition of each 100 g aliquot, the cylindrical cup was placed in the apparatus and the piston activated to exert a pressure of 10 psi on the soil column. This procedure was repeated until all ten 100 g aliquots had been added and compacted. The height of the soil column was then determined by measuring from the top of the cup to the top of the plate, correcting for the plate thickness, and subtracting the total from the inside height of the cup.

The untreated material was then removed from the cup and placed in a laboratory beaker. Care was taken to ensure all visible material was removed and transferred. Water was added to the beaker on a weight basis equal to 12% of the untreated material. TGPA was then added at a dose of 5%, also by weight, of the untreated material. The untreated material and amendments were mixed with a laboratory spatula by folding and allowed to sit overnight.

The treated material was then removed from the beaker and placed in the cylindrical cup in ten stages of approximately 100 g each. The pneumatic piston was activated at the same 10 psi pressure each time treated material was added to the cup. After all of the treated material was transferred and compacted with the apparatus, the resultant column height was calculated as previously described. After the material had been allowed to sit for approximately seven (7) days, the volume test was performed again in the same manner. The results of the study are presented in Table XIV.

TABLE XIV

Volume Change of Eastern United States Sample Material Treated with 5% (wt.) TGPA

| Mass Untreated (grams) | Height Untreated (cm) | Mass Treated <24 hours (grams) | Height Treated <24 hours (cm) | Mass Treated 7 days (grams) | Height Treated 7 days (cm) |
|---|---|---|---|---|---|
| 1003.09 | 8.2 | 1074.77 | 7.4 | 942.51 | 6.7 |

These test results show a total volume reduction of 9.75% after 24 hours and 22.4% after 7 days, relative to the initial untreated material.

In the next series of studies, sample material from a site in the midwestern United States was utilized in treatability studies. The material contained small soil grains (with 100% passing through a 9.5 mm seive) and was comprised of 30% sand, 47% silt, and 23% clay as determined by ASTM D-422 (Particle-Size Distribution). The average density of the material was 1.43 g/cc and the material had a moisture content of 16 percent by weight and a pH of 6.0 S.U.

As in the previous examples, the sample material was characterized for radionuclides and other radioactive substances. Nuclide leachability was examined utilizing the Toxic Characteristic Leaching Procedure (TCLP) extraction procedure (USEPA SW-846, Method 1311). Material was also subjected to other leaching tests including the Synthetic Precipitation Leaching Procedure (SPLP) extraction procedure (USEPA SW 846, Method 1312), and a modified version of the TCLP extraction method, where deionized water was substituted for the extraction fluid (DI/TCLP). Results of the gamma-spectral, Uranium, and Technetium-99 characterization analyses on extraction fluids are presented in Table XV.

TABLE XV

Untreated Midwestern United States Sample Material Radionuclide Leachability Characteristics

| Radionuclide/ Isotope/Item | US-4 Method 1311 TCLP | US-5 Method 1312 SPLP | US-6 Modified-1311 DI/TCLP |
|---|---|---|---|
| Ra-226 | 3,644 +/− 895 | 3,120 +/− 494 | 556 +/− 219 |
| U-235 | 266 +/− 66 | 190 +/− 43 | 39 +/− 25 |
| U-238* | 12,308 +/− 969 | 11,210 +/− 92 | 2,590 +/− 45 |
| Pb-212 | 16 +/− 4 | <MDA | <MDA |
| Th-234 | 485 +/− 138 | 355 +/− 90 | 228 +/− 73 |
| Tc-99 | 238 +/− 11 | 152 +/− 10 | 235 +/− 11 |
| U | 8,698 +/− 68 | 7,922 +/− 65 | 1,830 +/− 32 |
| U, total (ug/l) | 17,979 | 16,375 | 3,783 |

NOTE: All units in pCi/l, unless indicated
*U-238 concentrations were calculated.
<MDA = less than the calculated Minimum Detectable Activity (MDA) for the counted sample.

EXAMPLE 10

In this example, four 400 g samples of soil material (TS-7, TS-8, TS-9 and TS-10) were prepared from the untreated midwestern U.S. sample material and placed in separate laboratory beakers. Sample TS-7 was used as a control and mixed only with 120 ml of deionized water. For each of the three other samples, 120 ml of deionized water and varying amounts of TGPA were added to each beaker and mixed until a uniform consistency was achieved: TS-8=120 ml DI water+3% (wt.) TGPA; TS-9=120 ml DI water+5% (wt.) TGPA; and TS-10=120 ml DI water+10% (wt.) TGPA. When the mixing was completed, no free liquids were present.

After sitting overnight, a 100 g sample of treated material was removed from each beaker and extracted by USEPA SW-846, Method 1311 (TCLP), using Fluid No. 2, to simulate exposure to acidic landfill leachate. The radionuclide leachability for each extract was then quantified by gamma spectroscopy. Total Uranium and Technetium-99 tests were also conducted. Uranium-238 was calculated, assuming the total Uranium present was 100% depleted. The levels of leachable radionuclides and other radioactive substances in the sample material after treatment are presented below in Table XVI. The results in Table XVI can be compared to the results for sample US-4 in Table XV for reference.

TABLE XVI

Radionuclide Leachability of Midwestern United States
Sample Material in USEPA SW-846, Method 1311 (TCLP)
Fluid No. 2 Extract after Treatment with TGPA

| Radionuclide/<br>Isotope/Item | TS-7<br>DI WATER | TS-8<br>3% TGPA | TS-9<br>5% TGPA | TS-10<br>10% TGPA |
|---|---|---|---|---|
| Ra-226 | 3,114 +/− 568 | <MDA | <MDA | <MDA |
| U-235 | 231 +/− 55 | <MDA | <MDA | <MDA |
| U-238*(ug/l) | 5,847 +/− 184 | 54.5 +/− 1.7 | 51.7 +/− 1.7 | 53.5 +/− 1.7 |
| Th-234 | 230 +/− 97 | <MDA | <MDA | <MDA |
| Tc-99 | 213 +/− −14.3 | 67.6 +/− 8.5 | 55.6 +/− 10.4 | 3.7 +/− 4.8 |
| U | 4,132 +/− 130 | 38.5 +/− 1.2 | 36.5 +/− 1.2 | 37.8 +/− 1.2 |
| U, total(ug/l) | 8,541 | 80 | 75 | 78 |

NOTE: All units in pCi/l, unless indicated
*U-238 concentrations were calculated.
<MDA = less than the calculated Minimum Detectable Activity (MDA) for the counted sample

EXAMPLE 11

100 g samples of material treated in Example 10 (TS-7, TS-8, TS-9 and TS-10) were sub-sampled, extracted and analyzed by USEPA SW-846, Method 1312 (SPLP), where the extraction fluid utilized simulated acid rain. Each extract was then quantified for radionuclides by gamma-spectroscopy, and total Uranium and Technetium-99 tests were conducted. Uranium-238 was calculated, assuming the total Uranium present was 100% depleted. The results of the leachable radionuclides and other radioactive substances in the soil after treatment are presented below in Table XVII. The results in Table XVII can be compared to the results for sample US-5 in Table XV for reference.

TABLE XVII

Radionuclide Leachability
in EPA SW-846, Method 1312 (SPLP) Extract
after Treatment with TGPA

| Radio<br>nuclide/<br>Isotope/<br>Item | TS-7<br>CONTROL | TS-8<br>3% TGPA | TS-9<br>5% TGPA | TS-10<br>10% TGPA |
|---|---|---|---|---|
| Ra-226 | 2,622 +/− 443 | 233 +/− 136 | <MDA | <MDA |
| U-235 | 153 +/− 37 | <MDA | <MDA | <MDA |
| U-238* | 6,065 +/− 192 | 30.1 +/− 1.0 | 8.8 +/− 0.1 | 7.3 +/−0.1 |
| Th-234 | 170 +/− 81 | <MDA | <MDA | <MDA |
| Tc-99 | 210 +/− 15 | 55.6 +/− 7.8 | 23.2 +/− 6.5 | 69.8 +/−7.6 |
| U | 4,286 +/− 136 | 21.3 +/− 0.7 | 6.3 +/− 0.1 | 5.2 +/−0.1 |
| U,total<br>(ug/l) | 8,859 | 44 | 13.9 | 10.7 |

NOTE: All units in pCi/l, unless indicated
*U-238 concentrations were calculated.
<MDA = less than the calculated Minimum Detectable Activity (MDA) for the counted sample

EXAMPLE 12

100 g samples of treated soil material in Example 10 (TS-7, TS-8, TS-9 and TS-10) were subsampled and extracted by USEPA SW-846, Method 1311 with laboratory grade deionized water substituted for the extraction fluid. Although material treated by the invention would never likely be exposed to similar fluid except in the laboratory settings, deionized water is considered by many to be a harsh extraction test as leachable ionic species will tend to diffuse from zones of high concentration to zones of low concentration. Each DI water extract was then quantified for radionuclides by gamma-spectroscopy, and total Uranium and Technetium-99 tests were conducted. Uranium-238 was calculated, assuming the total Uranium present was 100% depleted. The results showing the level of leachable radionuclides and other radioactive substances in the soil after treatment are presented below in Table XVIII for TS-7, TS-8, TS-9 and TS-10. The results in Table XVIII can be compared to the results for sample US-6 in Table XV for reference.

TABLE XVIII

Radionuclide Leachability in EPA SW-846,
Modified Method 1311 with DI Extraction Water
after Treatment with TGPA

| Radio-<br>nuclide/<br>Isotope/<br>Item | TS-7<br>CONTROL | TS-8<br>3% TGPA | TS-9<br>5% TGPA | TS-10<br>10% TGPA |
|---|---|---|---|---|
| Ra-226 | 940 +/− 278 | <MDA | <MDA | <MDA |
| U-235 | 55 +/− 40 | <MDA | <MDA | <MDA |
| U-238* | 1,807 +/− 57 | 30.1 +/− 1.0 | 8.8 +/− 0.1 | 7.3 +/− 0.1 |
| Th-234 | 103 +/− 89 | <MDA | <MDA | <MDA |
| Tc-99 | 207 +/− 15 | 55.6 +/− 7.8 | 23.2 +/− 6.5 | — |
| U | 1,277 +/− 40 | 4.4 +/− 0.1 | 5.2 +/− 0.1 | 5.9 +/− 0.1 |
| U, total<br>(ug/l) | 2,640 | 9.1 | 10.6 | 12.1 |

NOTE: All units in pCi/l, unless indicated
*U-238 concentrations were calculated.
<MDA = less than the calculated Minimum Detectable Activity (MDA) for the counted sample

EXAMPLE 13

Examples 13 and 14 demonstrate additional uses for the present invention. Sample material and RGW for Examples 13 and 14 were obtained from the midwestern United States site. To establish baseline untreated characterization data, RGW and soil+RGW samples were tested for radionuclides and other radioactive substances using SPLP and RGW/TCLP extraction methods, prior to adding TGPA to the sample material. The following tests were performed:

1) RGW was tested for total radionuclides and other radioactive substances (US-7);
2) RGW was mixed into the sample material at 30% (wt.), Radionuclides and other radioactive substances were examined in the amended sample material's SPLP extract (US-8); and
(3) DI water was mixed into the sample material at 30% (wt.). Radionuclides and other radioactive substances were examined in the amended sample material's modified TCLP extract where RGW was utilized as the substitute TCLP extraction fluid (US-9).

Table XIX presents the baseline data. Previous SPLP extraction test results from the same sample material amended only with DI water (US-5) are presented for comparison.

TABLE XIX

Baseline Radionuclide Leachability for Untreated sample Material Using Radioactive Groundwater (RGW) as a Dispersing Agent and Extraction Fluid

| Radionuclide/<br>Isotope/Item | US-7<br>RGW<br>Totals | US-8<br>30% RGW<br>SPLP<br>Extract | US-9<br>30% DI $H_2O$<br>RGW as<br>TCLP Fluid | US-5<br>30% DI Water<br>SPLP<br>Extract |
|---|---|---|---|---|
| Bi-211 | 234 +/− 18 | <MDA | <MDA | <MDA |
| Ra-224 | <MDA | <MDA | 254 +/− 131 | <MDA |
| Pb-212 | <MDA | <MDA | 27.8 +/− 11.7 | <MDA |
| Ra-226 | 56 +/− 7 | <MDA | <MDA | <MDA |
| U-235 | 9,251 +/− 1.341 | 261 +/− 49 | 8,353 +/− 115 | 9,190 +/− 43 |
| Th-234 | 35,940 +/− 5,027 | 560 +/− 113 | 26,220 +/− 462 | 3,355 +/− 90 |
| U,total (mg/l) | 97,431 | 7,813 | 66,471 | 16,375 |
| U-238 (ug/l) | 45,793 | 3,696 | 31,441 | 11,210 |
| Tc-99 | 126,790 | 580 +/− 30 | 63,241 +/− 589 | 152 +/− 10 |
| pH (S.U.) | 7.5 | | | |
| TSS (mg/l) | 1,320 | | | |
| TDS (mg/l) | 4,400 | | | |
| Hardness[$CaCO_3$ (mg/l)] | 1,734 | | | |

*U-238 concentrations were calculated.
All units expressed as pCi/l, unless indicated
<MDA = less than Minimum Detectable Activity for the counted sample.

EXAMPLE 13

In Example 13, the effects of extracting TGPA treated radioactive sample material containing RGW with USEPA's simulated acid rain leaching method (SPLP) are presented. In this example, RGW was used as a dispersion agent in place of deionized water. Contaminated sample material (characterized in Table XIX) was mixed with RGW at 30% (wt.). Three (3) equivalent aliquots of the sample material mixed with RGW were placed in separate beakers. In the first beaker, TGPA was added at a dose of 2% (wt.) and mixed (TS-11). In the second beaker, TGPA was added at a dose of 5% (wt.) and mixed (TS-12). In the third beaker, TGPA was added at a dose of 10% (wt.) and mixed (TS-13). The amount of TGPA added was calculated from the base mass of the untreated sample material exclusive of the RGW mass added.

Table XX presents the data from the analysis of SPLP extract for each of the treated samples (TS-11, 12, and 13). The untreated characterization data from samples (US-7, and US-8) are presented in Table XIX for comparison. The SPLP extraction (SW-846, Method 1312) is USEPA's procedure for simulating soil exposure to acid rain. The SPLP method calls for the extraction of 100 g of material with 2000 ml of simulated acid rain fluid.

TABLE XX

TGPA Soil Treatment Results:
Radionuclides in SPLP Extract of Sample Material
Mixed with 30% (wt.) Radioactive Groundwater

| Radionuclide/<br>Isotope/<br>Item | TS-11<br>Treated<br>2% TGPA | TS-12<br>Treated<br>5% TGPA | TS-13<br>Treated<br>10% TGPA |
|---|---|---|---|
| Bi-211 | <MDA | <MDA | <MDA |
| Ra-226 | <MDA | <MDA | <MDA |

TABLE XX-continued

TGPA Soil Treatment Results:
Radionuclides in SPLP Extract of Sample Material
Mixed with 30% (wt.) Radioactive Groundwater

| Radionuclide/<br>Isotope/<br>Item | TS-11<br>Treated<br>2% TGPA | TS-12<br>Treated<br>5% TGPA | TS-13<br>Treated<br>10% TGPA |
|---|---|---|---|
| U-235 | <MDA | <MDA | <MDA |
| Th-234 | <MDA | <MDA | <MDA |
| U, total, (mg/l) | 30 | 19 | 38 |
| U-238 (ug/l)* | 14 | 9 | 18 |
| Tc-99 | 292 +/− 21 | 322 +/− 23 | 280 +/− 21 |

RGW (characterized in US-7) was added to TS-11, TS-12, and TS-13 at a dose of 30% (wt.) prior to TGPA addition.
All units expressed as pCi/l, unless indicated.
<MDA = less than Minimum Detectable Activity for the counted sample
*U-238 concentrations were calculated.

Example 14

In Example 14, sample materials containing radionuclides and other radioactive substances was treated with varying doses of TGPA and DI water was utilized as a dispersing agent. These treated samples were then extracted using the modified TCLP method (RGW/TCLP) where RGW was substituted for the specified extraction fluid (TCLP Fluid No. 2). The sample material was mixed with DI water and three (3) equivalent aliquots of the material were placed in separate beakers. In the first beaker, TGPA was added at a dose of 2% (wt.) and mixed (TS-14). In the second beaker, TGPA was added at a dose of 5% (wt.) and mixed (TS-15). In the third beaker, TGPA was added at a dose of 10% (wt.) and mixed (TS-16). The percent weight of TGPA added was calculated from the initial base mass of the untreated sample material exclusive of the RGW mass added.

Each of the treated samples were then extracted using the RGW/TCLP method with RGW fluid added at the method specified volume and ratio (100 g soil: 2000 ml fluid).

Table XXI presents the data from the analysis of the modified RGW/TCLP extract for each of the treated samples (TS-14, 15, and 16). The untreated characterization data from RGW (US-7) and untreated soil extract by RGW/TCLP (US-9) are presented in Table XIX for comparison.

TABLE XXI

TGPA Treatment Results:
Radionuclides in Modified RGW/TCLP Extract of
Sample Material Mixed with 30% (wt.) DI Water

| Radionuclide/ Isotope/ | TS-14 2% TGPA RGW/TCLP | TS-15 5% TGPA RGW/TCLP | TS-16 10% TGPA RGW/TCLP |
|---|---|---|---|
| Bi-211 | <MDA | <MDA | <MDA |
| Ra-226 | <MDA | <MDA | <MDA |
| U-235 | 2,513 +/− 461 | 1,919 +/− 267 | <MDA |
| Th-234 | <MDA | 5,656 +/− 790 | 200 +/− 170 |
| U, total, (mg/l) | 18,191 | 11,880 | 18 |
| U-238 (ug/l)* | 8,604 | 5,619 | 9 |
| Tc-99 | 45,738 +/− 222 | 60,398 +/− 255 | 35,176 +/− 195 |

2000 ml of RGW (characterized in US-7) was added as the TCLP extraction fluid to 100 g of the treated sample matrix.
All units expressed as pCi/l, unless indicated.
<MDA = less than Minimum Detectable Activity for the counted sample.
*U-238 concentrations were calculated.

Examples 13 and 14 show that the present invention can use radioactive groundwater as a dispersing agent and that materials treated by the present invention can be used to treat RGW. These examples also demonstrate that acid rain will not affect treated material.

EXAMPLE 15

Example 15 examines the leachability of constituents from a host material based on a calculation of the distribution coefficient ($K_d$) for a given analyte (e.g., a specific constituent measured by the analyses). The distribution coefficient is expressed in ml/g and calculated as the quotient of the activity of nuclide sorbed per unit mass of host material (expressed in pCi/g), and the activity of the nuclide in extract solution per unit volume of extract (expressed in pCi/ml). $K_d$ is an equilibrium value often calculated to determine the sorption affinity of waste analytes (e.g., nuclides) by host matrix (e.g., contaminated material) in aqueous or other fluid suspensions. In this example, the distribution coefficients are calculated for the untreated (Table XXII) and TGPA treated material (Table XXIII). The same calculations can be made for similar extractions using other extraction fluids such as, deionized water, SPLP or RGW.

TABLE XXII

Calculated Distribution Coefficient (Kd) of
Untreated Sample Material Modified Using
SW-846, Method 1311 Extraction Method

| ANALYTE | US-10 Total Activity (pCi/g) | US-1 TCLP Fluid 2 (pCi/l) | US-1 TCLP Fluid 2 (pCi/ml) | Modified Distribution Coefficient ($K_d$) (ml/g) |
|---|---|---|---|---|
| Pb-210 | 179 | 173 | 0.173 | 1,034.7 |
| Bi-211 | 4,212 | 3,360 | 3.360 | 1,253.6 |
| Bi-214 | 1,321 | 910 | 0.910 | 1,373.6 |
| Fr-223 | 3,919 | 3,768 | 3.768 | 1,040.1 |
| Ra-223 | 1,574 | 1,514 | 1.514 | 1,039.6 |
| Ra-224 | 2,463 | 1,772 | 1.772 | 1,390.0 |
| Ra-226 | 1,800 | 1,294 | 1.294 | 1,391.0 |

TABLE XXII-continued

Calculated Distribution Coefficient (Kd) of
Untreated Sample Material Modified Using
SW-846, Method 1311 Extraction Method

| ANALYTE | US-10 Total Activity (pCi/g) | US-1 TCLP Fluid 2 (pCi/l) | US-1 TCLP Fluid 2 (pCi/ml) | Modified Distribution Coefficient ($K_d$) (ml/g) |
|---|---|---|---|---|
| Ac-227 | 188 | 243 | 0.243 | 773.7 |
| Th-227 | 960 | 921 | 0.921 | 1,042.3 |
| Th-228 | 17,110 | 16,490 | 16.490 | 1,037.6 |
| Pa-231 | 1,857 | 1,764 | 1.764 | 1,052.7 |
| U-235 | 326 | 313 | 0.313 | 1,041.5 |
| Th-234 | NT | 19 | 0.019 | — |

TABLE XXIII

Calculated Distribution Coefficient (Kd) of
TGPA Treated Sample Material Modified Using
SW-846, Method 1311 Extraction Method

| ANALYTE | US-10 Untreated Material Total Activity (pCi/g) | TS-1 5% TGPA TCLP Extract (pCi/l) | TS-1 5% TGPA TCLP Extract (pCi/ml) | Modified Distribution Coefficient ($K_d$) (ml/g) |
|---|---|---|---|---|
| Pb-210 | 179 | <82 | <0.082 | >2,183 |
| Bi-211 | 4,212 | <21 | <0.021 | >200,571 |
| Bi-214 | 1,321 | <21 | <0.021 | >62,905 |
| Pb-214 | 1,250 | <20 | <0.020 | >62,500 |
| Fr-223 | 3,919 | <226 | <0.226 | >17,341 |
| Ra-223 | 1,574 | <37 | <0.037 | >42,541 |
| Ra-224 | 2,463 | <50 | <0.050 | >49,260 |
| Ra-226 | 1,800 | <190 | <0.190 | >9,474 |
| Ac-227 | 188 | <44 | <0.044 | >4,273 |
| Th-227 | 960 | <56 | <0.056 | >17,143 |
| Th-228 | 17,110 | <588 | <0.588 | >29,099 |
| Pa-231 | 1,857 | <272 | <0.272 | >6,827 |
| U-235 | 326 | <104 | <0.104 | >3,135 |
| Th-234 | NT | <12 | <0.012 | NA |

Tables XXII and XXIII show an increase of the sorption affinity of the radionuclides by the host material as a result of treatment with TGPA. Further, the calculations in Tables XXII and XXIII utilize the MDA values for the equation denominator. The MDA is based on numerous factors, including count times, background, detector efficiency, recovery, decay, and other variables. Therefore, the $K_d$ values for radionuclides in materials treated with TGPA are actually higher than what can be empirically determined when the nuclide presence in extract is <MDA.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A process for treating a host material comprising containing leachable radionuclides and radioactive compounds, said soil process comprising the steps of:

contacting said host material with a single reactant comprising a source of a sulfate ion and a phosphate ion to form a mixture, said mixture containing substantially insoluble Apatitic-structure mineral species; and curing said mixture for a period of time; wherein said host material so treated is substantially solid in form at the end of curing, the concentration of leachable radionuclides and radioactive materials is decreased and no secondary waste streams are generated.

2. The process of claim 1, wherein said process comprises an additional step of contacting said host material with radioactive groundwater.

3. A process for treating a liquid containing leachable radionuclides and radioactive compounds, said process comprising the steps of:

contacting said contaminated liquid with a single reactant comprising a source of a sulfate ion and a phosphate ion to form a mixture, said mixture containing substantially insoluble Apatitic-structure mineral species; and curing said mixture for a period of time; wherein said mineral species precipitate from said liquid at the end of curing and the concentration of leachable radionuclides and radioactive materials in the liquid is decreased.

4. The process of claim 3, wherein said single reactant is technical grade phosphoric acid (TGPA).

5. The process of claim 1, wherein said single reactant is technical grade phosphoric acid (TGPA).

6. The process of claim 1, wherein said process comprises an additional step of contacting said host material with water.

7. A process for treating a host material comprising sludge containing leachable radionuclides and radioactive compounds, said process comprising the steps of:

contacting said host material with a single reactant comprising a source of a sulfate ion and a phosphate ion to form a mixture, said mixture containing substantially insoluble Apatitic-structure mineral species; and curing said mixture for a period of time;

wherein said host material so treated is substantially solid in form at the end of curing, the concentration of leachable radionuclides and radioactive materials is decreased and no secondary waste streams are generated.

8. The process of claim 7, wherein said process comprises an additional step of contacting said host material with radioactive groundwater.

9. The process of claim 7, wherein said single reactant is technical grade phosphoric acid (TGPA).

10. The process of claim 7, wherein said process comprises an additional step of contacting said host material with water.

11. A process for treating a host material comprising solid waste materials containing leachable radionuclides and radioactive compounds, said process comprising the steps of:

contacting said host material with a single reactant comprising a source of a sulfate ion and a phosphate ion to form a mixture, said mixture containing substantially insoluble Apatitic-structure mineral species; and curing said mixture for a period of time;

wherein said host material so treated is substantially solid in form at the end of curing, the concentration of leachable radionuclides and radioactive materials is decreased and no secondary waste streams are generated.

12. The process of claim 11, wherein said process comprises an additional step of contacting said host material with radioactive groundwater.

13. The process of claim 11, wherein said single reactant is technical grade phosphoric acid (TGPA).

14. The process of claim 11, wherein said process comprises an additional step of contacting said host material with water.

15. The process of claim 11, wherein said solid waste materials are debris.

16. The process of claim 11, wherein said solid waste materials are contaminated fine-grained solids.

* * * * *